United States Patent
Patience

(10) Patent No.: US 6,631,711 B2
(45) Date of Patent: Oct. 14, 2003

(54) FOLDING CHARCOAL GRILLS AND STARTER DEVICES AND METHODS OF USE

(76) Inventor: Eric Patience, 4-64 Ondoyama-cho Narutaki, Ukyo-ku, Kyoto 616-8255 (JP)

( * ) Notice: Subject to any disclaimer, the term of this patent is extended or adjusted under 35 U.S.C. 154(b) by 96 days.

(21) Appl. No.: 09/799,716

(22) Filed: Mar. 7, 2001

(65) Prior Publication Data

US 2001/0029940 A1 Oct. 18, 2001

Related U.S. Application Data

(60) Provisional application No. 60/188,183, filed on Mar. 10, 2000, and provisional application No. 60/235,888, filed on Sep. 28, 2000.

(51) Int. Cl.$^7$ ................................................. F24C 5/04
(52) U.S. Cl. ....................... 126/25 B; 126/9 R; 126/9 B
(58) Field of Search ................................ 126/9 R, 9 B, 126/9 A, 30, 274, 25 B

(56) References Cited

U.S. PATENT DOCUMENTS

| | | | | |
|---|---|---|---|---|
| 33,995 A | * | 12/1861 | Johns | 126/59 |
| 256,894 A | * | 4/1882 | Hare | 126/152 R |
| 1,207,553 A | * | 12/1916 | Hill | 126/29 |
| 1,298,762 A | * | 4/1919 | Milligan | 126/25 R |
| 1,651,818 A | * | 12/1927 | Gorrell | 110/241 |
| 2,424,665 A | * | 7/1947 | Pope, Sr. | 126/9 R |
| 2,920,614 A | * | 1/1960 | Phelps | 126/25 B |
| 3,167,040 A | * | 1/1965 | Byars, Sr. et al. | 126/25 B |
| 3,216,379 A | * | 11/1965 | Durfee | 126/25 B |
| 3,384,066 A | * | 5/1968 | Tufts | 126/9 R |
| 4,023,553 A | * | 5/1977 | London et al. | 126/25 B |
| 4,026,265 A | * | 5/1977 | Spadaro | 126/25 B |
| 4,282,854 A | * | 8/1981 | Byars | 126/25 B |
| 4,363,313 A | * | 12/1982 | Smith | 126/9 R |
| 4,455,992 A | * | 6/1984 | Hsiao | 126/9 R |
| 5,638,807 A | * | 6/1997 | Flamenbaum | 126/25 B |

OTHER PUBLICATIONS

*Barbecook Charcoal Grill\* barbecook is the best charcoal grill in the world*, H.E.A.T. Distributors, as printed on Jul. 20, 2001 http://www.heatdis.com/grillparts/barbecook.htm (Internet advertising).

\* cited by examiner

*Primary Examiner*—Carl D. Price
(74) *Attorney, Agent, or Firm*—Arent Fox Kinter Plotkin & Kahn PLLC; Wilburn Chesser

(57) ABSTRACT

A self-contained, easily foldable and reconfigurable charcoal lighting and/or grill device. In some variations, the lighting and/or grill device is arrangeable into multiple configurations: 1) in which the device has a thin profile for easy carrying and storage; 2) in which the device facilitates fuel lighting by forming an enclosure; and 3) for the combination charcoal and grill device only, in which the device has a generally U-shaped profile, with extended legs and one or more side handles for grilling foods. Another variation of the device includes an ignition enhancer housing that is suspendably attached to an existing grill. A rack is positioned above the housing, and one or more doors are used in conjunction with the existing grill sides to form an enclosure to enhance lighting of fuel. Upon lighting, the one or more doors are rearrangeable such that the grill may be used normally.

13 Claims, 20 Drawing Sheets

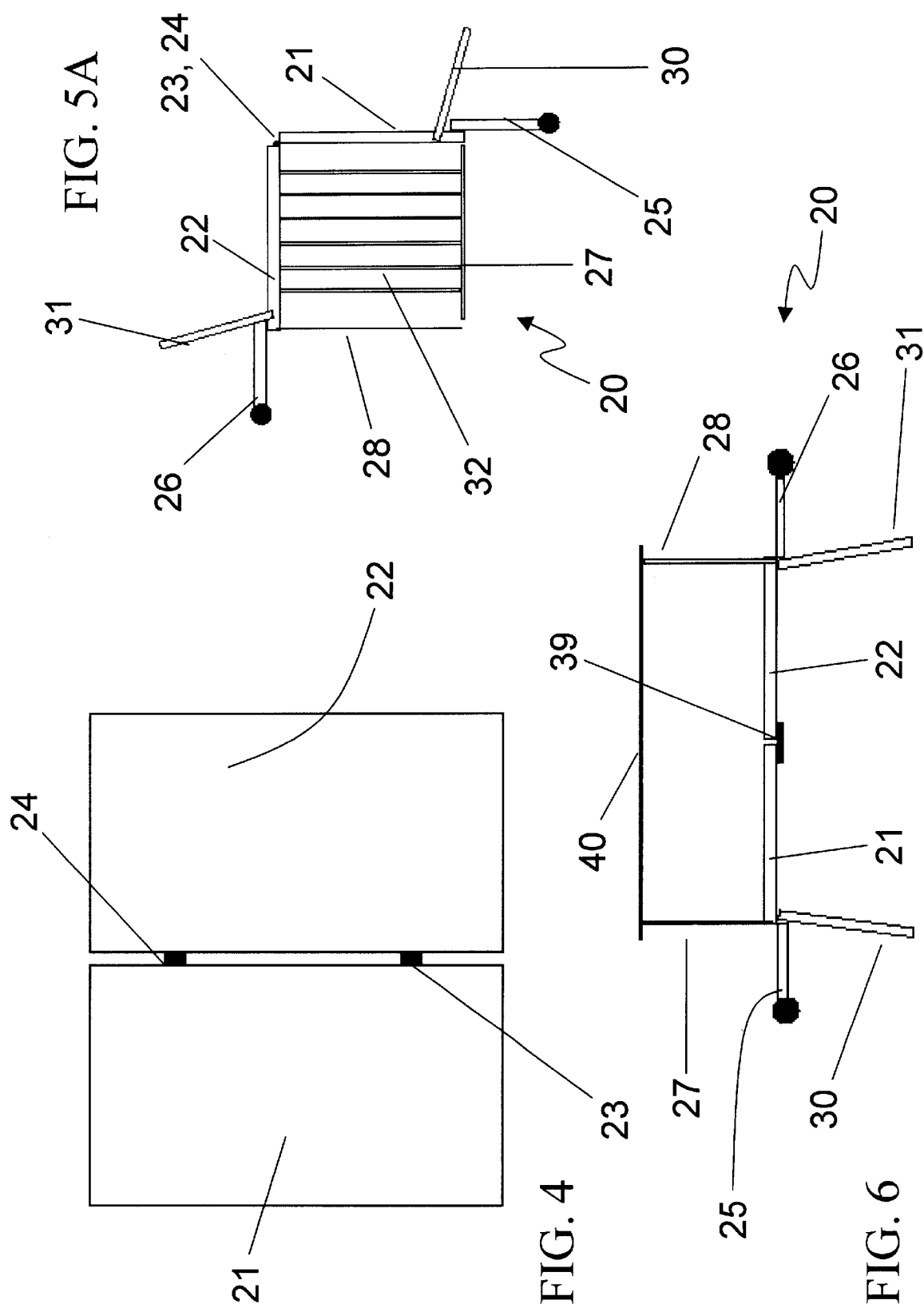

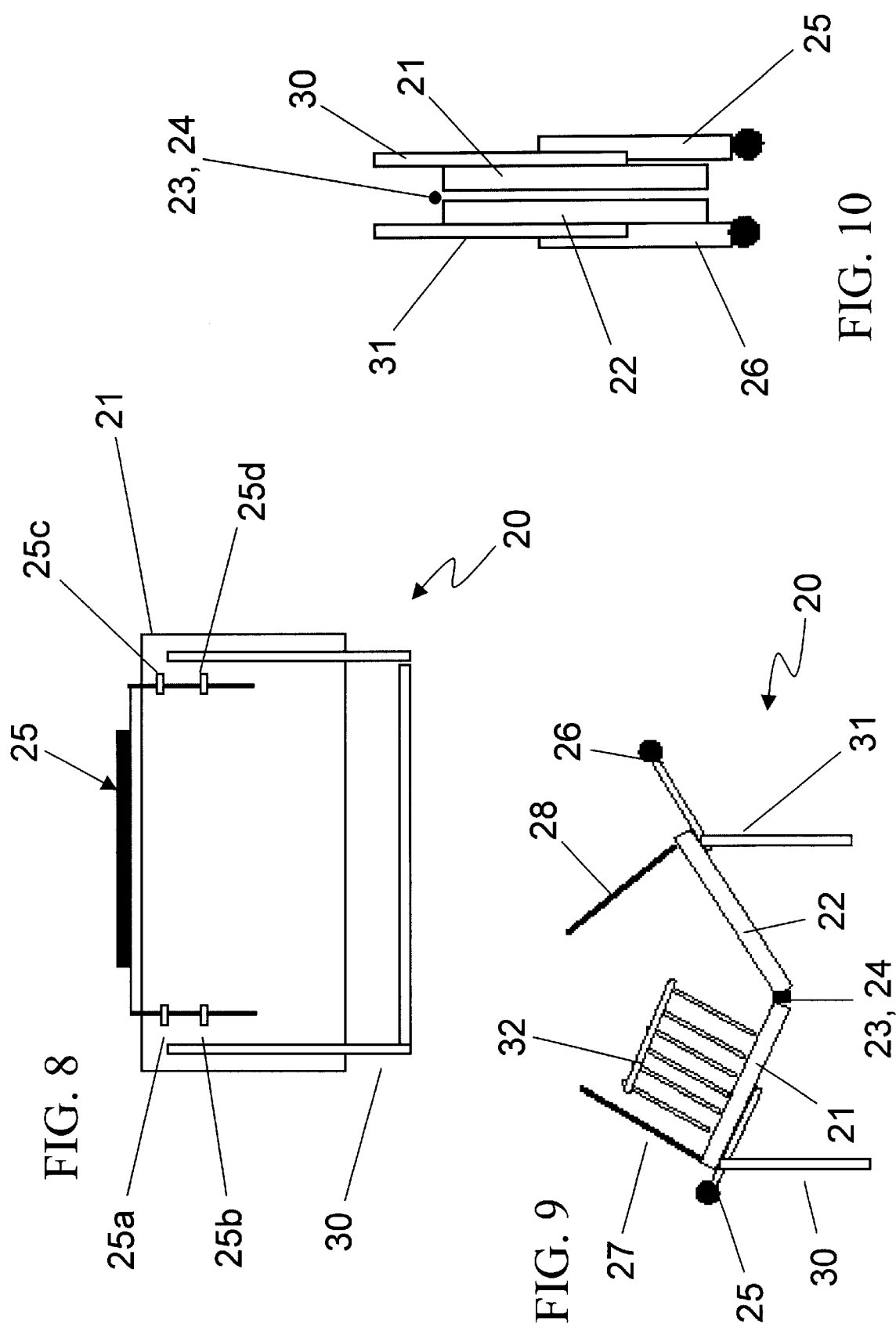

FOLDING CHARCOAL GRILLS AND STARTER DEVICES AND METHODS OF USE

This application claims priority to applicant's copending U.S. Provisional Patent Application Ser. No. 60/188,183 titled "FOLDING CHARCOAL GRILL AND STARTER DEVICE AND METHOD OF USE" filed Mar. 10, 2000, and copending U.S. Provisional Patent Application Ser. No. 60/235,888 titled "FOLDING CHARCOAL STARTER DEVICE AND METHOD OF USE"filed Sep. 28, 2000. The entirety of these two provisional applications are incorporated herein by reference.

BACKGROUND OF THE INVENTION

1. Field of the Invention

This invention relates to charcoal grills and charcoal lighting devices, and in particular, to folding charcoal grills and lighting devices arrangeable into multiple configurations to facilitate lighting of coals, for use as or in conjunction with grills, and to facilitate handling and carrying.

2. Background of the Technology

Grilling of foods using fuel driven grills, such as charcoal grills, is well known. The ignition of the fuels is necessary in order to allow such grills to be used. It is known to use a lighting initiator, such as lighter fluid poured on charcoal to allow easier lighting. This approach presents several problems. For example, the use of an initiator, such as lighter fluid, is typically dangerous because such initiators are generally volatile, producing a hazard for burning of the user and toxicity through inhalation. These initiators are also often toxic or harmful to the user's skin and eyes, and may be subject to environmental or other restrictions, such as air pollution regulations. Further, the use of lighter fluid can often necessitate additional cleanup because of spillage, and many people find these initiators to have an adverse effect on the taste of grilled foods.

It is also known to use a chimney, such as a coffee can with the ends removed and vent holes added, to facilitate lighting of fuels. With these devices, paper or another ignition enhancer is placed in the bottom of the chimney, and the charcoal or other fuel is placed on top of the paper. The paper is then lit using the vent holes in the can, which also enhance air flow to increase the speed of lighting of the charcoal. This approach also presents several problems. The chimney typically becomes hot to the touch and is difficult to remove once the charcoal is lit. The chimney must also be carried separately from the grill and remembered when the grill is relocated.

There thus remains an unmet need to provide devices and methods for lighting grill fuels in simpler and more self-contained manners than the existing approaches to fuel lighting. There is a further unmet need to provide a simple manner for transporting and storing such grills and lighting devices without such devices becoming unwieldy. There is yet a further unmet need for improved devices, methods, and systems for transporting grills and lighting equipment.

SUMMARY OF THE INVENTION

It is an advantage of the present invention to meet these needs, and others, by providing rearrangeable grill and lighting devices that are easily transported. It is a further advantage of the present invention to provide variations of grills having at least two sides and a bottom, with adjustable legs and handles, that are rearrangeable into closed lighting positions and into upright grilling positions. It is a further advantage of the present invention to provide such rearrangeable grills that allow rearranging without spilling lit fuel.

It is a further advantage of the present invention to provide rearrangeable charcoal lighting devices that are easily transported and that are usable in conjunction with existing grills. It is a further advantage of the present invention to provide a lighting device having sides and a bottom, with one or more adjustable handles, that is rearrangeable into a closed lighting position and into a slim profile, folded configuration for easy carrying, storage, and handling. It is a further advantage of the present invention to provide such a rearrangeable lighting device that allows easy transfer of the lit fuel to the grill without spilling the lit fuel.

It is yet another advantage of the present invention to provide rearrangeable grill devices that are further rearrangeable into slim profile, folded configurations for easy carrying, storage, and handling.

It is yet a further advantage of the present invention to provide rearrangeable grill and lighting devices that, in closed lighting positions, include internal racks to hold fuel above an initiator, and vent openings to facilitate lighting of the fuel.

It is yet a further advantage of the present invention to provide rearrangeable grill and lighting devices that include insulated handles to reduce the likelihood of burning or other injury and to facilitate handling, rearrangement, and carrying of the devices.

A first embodiment of the present invention comprises a self-contained, easily foldable and rearrangeable charcoal lighting device and grill. In an embodiment of the present invention, the grill includes three distinct configurable arrangements, these arrangements facilitating the following: 1) carrying of the grill; 2) igniting of charcoal within the grill; and 3) distributing the charcoal and providing a suitably designed grill for cooking meat or other foods.

In the first embodiment, the grill is configurable into a first arrangement, in which the grill presents a thin profile for easy carrying via one or more attached handles. Rearranged from the first configuration into a second configuration for charcoal lighting, the grill forms a three sided closed shape with openings to receive an ignition source, such as matches, and a triangularly shaped rack bottom trap door to support charcoal for lighting. In this second configuration, an ignition fuel, such as crumpled paper is placed beneath the grill and beneath the rack bottom trap door. Charcoal is placed on top of the rack bottom trap door within the grill, and the fuel is ignited, which, in turn, ignites the contained charcoal. Upon suitable lighting of the charcoal, the grill is rearranged via the handles into a third configuration, in which the grill has a generally U-shaped profile, with extended legs and one or more side handles. The rearrangement into the third configuration causes the grill bottom trap door to sweep and distribute the lit charcoal into the interior portion of the U-shaped grill, with a bottom rack serving as a base for containing the charcoal. In one embodiment, a separate grill rack is placed above the distributed coals to serve as a cooking surface for meats or other grilled foods placed thereupon.

In a second embodiment of the rearrangeable grill device, the grill is configurable into a first arrangement, in which the grill presents a thin profile for easy carrying via one or more attached handles. Rearranged from the first configuration into a second configuration for charcoal lighting, the grill forms a four sided closed shape with openings to receive an ignition source, such as matches, and a square shaped rack bottom trap door to support charcoal for lighting. As with the first embodiment, in this second configuration, an ignition fuel, such as crumpled paper is placed beneath the grill and beneath the rack bottom trap door. Charcoal is placed on top of the rack bottom trap door within the grill, and the fuel is ignited, which, in turn, ignites the contained charcoal. Upon suitable lighting of the charcoal, the grill is rearranged via the handles into a third configuration, in which the grill has a generally U-shaped profile, with extended legs and one or more side handles. In this configuration, this embodiment has a two-piece grill bottom, in contrast to the first embodiment, which has a one-piece grill bottom. In one embodiment, a separate grill rack is placed above the distributed coals to serve as a cooking surface for meats or other grilled foods placed thereupon.

Another embodiment of the present invention comprises a self-contained, easily foldable and rearrangeable charcoal lighting device. In one embodiment, this device includes two distinct configurable arrangements, these arrangements facilitating the following: 1) carrying of the grill; 2) igniting of charcoal within the device; and 3) easily transferring and distributing the lit charcoal to a grill for cooking meat or other foods.

This embodiment of the lighting device is configurable into a first arrangement, in which the grill presents a thin profile for easy carrying via one or more attached handles. Rearranged from the first configuration into a second configuration for charcoal lighting, the device forms a four sided closed shape with openings to receive an ignition source, such as matches, and a square shaped rack bottom trap door and extending support for charcoal for lighting. In this second configuration, an ignition fuel, such as crumpled paper is placed beneath the rack bottom trap door. Charcoal is placed on top of the rack bottom trap door within the device, and the fuel is ignited, which, in turn, ignites the contained charcoal. In use, the charcoal lighting device is placed within a grill or other location for cooking or other use, such as heating, prior to lighting the fuel. Upon suitable lighting of the charcoal, the device is simply lifted by its handle, causing the bottom trap door to open and dump and distribute the lit charcoal into the grill or other cooking or heating location.

A second embodiment of the lighting device of the present invention is usable in conjunction with both rearrangeable and non-rearrangeable existing grill devices. In this embodiment, the lighting device includes an initiator holding tray portion, a rack top trap door, and a two piece fuel containment portion. The two piece fuel containment portion includes two pivotably connected doors that are arrangeable within an existing grill having grill sides so as to form a containment area within the existing grill above the initiator holding tray. A trap door rack is located on the top of the initiator holding tray. In use, fuel initiator is placed within the initiator holding tray portion, which includes openings for allowing lighting of the initiator and air flow to the initiator. The trap door rack on the initiator holding tray is placed or pivotably moved so as to cover the initiator holding tray portion, and the pivotably connected doors are arranged and connected to the existing grill sides so as to form a fuel containment area within a corner of the existing grill. In one embodiment, the pivotably connected doors are connected to the existing grill sides using one or more locator pins. Fuel, such as charcoal, is then placed in the fuel containment area, and the initiator is ignited, such that the fuel is able to light. Upon lighting of the fuel, the pivotably connected doors are rearranged, so that the lit fuel is dispersed within the existing grill and grilling can begin.

In one embodiment, the existing grill is altered for use with the second embodiment of the lighting device of the present invention. In this embodiment, an opening is made, such as by cutting, in one corner area of the bottom of the existing grill. The initiator holding tray portion is then attached to the existing grill, so as to be suspended beneath the bottom of the existing grill. In one embodiment, the initiator holding tray portion is detachable, to allow, for example, more compact storage of the altered existing grill device.

In one embodiment, the two pivotably connected doors are connected to the existing grill bottom by a second pivotable connection via one of the two doors. In this embodiment, the pivotably connected doors are moveable between two positions. In a first position, the two doors are pivoted so as to be perpendicular to the bottom of the existing grill bottom. A first door is pivotably attached to the bottom, and the second door is pivotably attached to the first door. The second door is pivoted relative to the first door, so that the two doors are arrangeable to form an approximately right angle to one another. The second door is attached to a side of the existing grill, such as by a pin, and the two connected doors in conjunction with two adjacent sides of the existing grill form a generally square cross sectional containment subportion of the grill area in one corner of the existing grill bottom. In a second position, the first and second doors are coplanar, parallel to the grill bottom, and adjacent the grill bottom; thus, the two doors rest on top of the grill bottom and adjacent one another in this position.

To achieve the stated and other advantages of the present invention, as embodied and described below, the invention includes a reconfigurable self-contained grill and fuel lighting device, comprising: a grill housing, the grill housing including at least a first side portion, a bottom portion, and a second side portion, and at least a first hingeable coupling and a second hingeable coupling, the first hingeable coupling attaching the first side portion to the bottom portion, and the second hingeable coupling attaching the bottom portion to the second side portion; at least one handle adjustably attached to the grill housing; and at least one extendable leg attached to the grill housing for supporting the grill; wherein the grill housing is reconfigurable via at least the first hingeable coupling and the second hingeable coupling into a first grill configuration, wherein, in the first position, the first side portion, the bottom portion, and the second side portion closeably form an enclosure, the enclosure enhancing fuel ignition; and wherein the grill housing is reconfigurable via at least the first hingeable coupling and the second hingeable coupling to a second grill configuration, wherein the first side portion, the bottom portion, and the second side portion form a structure having an open top.

To achieve the stated and other advantages of the present invention, as embodied and described below, the invention further includes a reconfigurable self-contained grill and fuel lighting device, comprising: a first grill housing side; a grill housing bottom coupled to the first grill housing side via a first pivotable coupling; a second grill housing side coupled to the grill housing bottom via a second pivotable coupling; and a location fixing device for fixably positioning the first grill housing side, second grill housing side, and the grill housing bottom in at least one position; wherein the device is reconfigurable via the first pivotable coupling and the second pivotable coupling into a first configuration, wherein, in the first configuration, the first grill housing side, the second grill housing side, and the grill housing bottom closeably form an enclosure, the enclosure enhancing ignition of fuel placed within the enclosure; and wherein the device is reconfigurable via the first pivotable coupling and the second pivotable coupling to a second configuration, wherein the first grill housing side, the second grill housing side, and the grill housing bottom form a structure having an open top for grilling.

To achieve the stated and other advantages of the present invention, as embodied and described below, the invention further includes a method for configuring and reconfiguring a self-contained grill and fuel lighting device, the grill and fuel lighting device comprising a first grill housing side; a grill housing bottom coupled to the first grill housing side via a first pivotable coupling; a second grill housing side coupled to the grill housing bottom via a second pivotable coupling; and a location fixing device for fixably positioning the first grill housing side, second grill housing side, and the grill housing bottom in at least one position; the method comprising: configuring the grill and fuel lighting device in a first configuration, configuring in the first configuration including: moving the first side to a first configuration first side position via the first pivotable coupling; and moving the second side to a first configuration second side position via the second pivotable coupling; wherein, in the first configuration, the first side, the second side, and the bottom closeably form an enclosure, the enclosure enhancing ignition of fuel placed within the enclosure; and reconfiguring the grill and fuel lighting device via the first pivotable coupling and the second pivotable coupling to a second configuration, reconfiguring to the second configuration including: moving the first side to a second configuration first side position via the first pivotable coupling; and moving the second side to a second configuration second side position via the second pivotable coupling; wherein the first side, the second side, and the bottom form a three sided structure having an open top for grilling.

To achieve the stated and other advantages of the present invention, as embodied and described below, the invention further includes a reconfigurable fuel lighting device, comprising: a housing, the housing including a first side having a first hinge coupling to a second side, the second side having a second hinge coupling to a third side, and the third side having a third hinge coupling to a fourth side; at least one handle adjustably attached to the housing; and a positionable rack for holding fuel; wherein the housing is reconfigurable via the first hinge coupling, the second hinge coupling, and the third hinge coupling into a first configuration, wherein, in the first position, the first side, the second side, the third side, and the fourth side closeably form an enclosure, the enclosure enhancing ignition of the fuel; and wherein the housing is reconfigurable via the first hinge coupling, the second hinge coupling, the third hinge coupling to a second configuration, wherein the first side, the second side, the third side, and the fourth side are generally parallel, the second configuration having a thin profile.

To achieve the stated and other advantages of the present invention, as embodied and described below, the invention also includes a reconfigurable fuel lighting device, comprising: a first housing side; a rack coupled to the first housing side via a first pivotable coupling; a second housing side coupled to the first housing side via a second pivotable coupling; a third housing side coupled to the second housing side via a third pivotable coupling; a fourth housing side coupled to the third housing side via a third pivotable coupling; and a location fixing device for fixably positioning the first housing side, the second housing side, the third housing side, and the fourth housing side in at least one position; wherein the device is reconfigurable via the first pivotable coupling, the second pivotable coupling, the third pivotable coupling, and the fourth pivotable coupling into a first configuration, wherein, in the first configuration, the first housing side, the second housing side, the third housing side, and the fourth housing side closeably form an enclosure, the enclosure enhancing ignition of fuel placed within the enclosure; and wherein the device is reconfigurable via the first pivotable coupling, the second pivotable coupling, the third pivotable coupling, and the fourth pivotable coupling to a second configuration, wherein the first grill side, the second housing side, the third housing side, and the fourth housing side are generally parallel, such that the device has a thin profile.

To achieve the stated and other advantages of the present invention, as embodied and described below, the invention also includes a method for configuring and reconfiguring a fuel lighting device, the fuel lighting device comprising a first housing side; a second housing side coupled to the first housing side via a first pivotable coupling; a third housing side coupled to the second housing side via a second pivotable coupling; a fourth housing side coupled to the third housing side via a third pivotable coupling; and a rack coupled to at least one of the first housing side, the second housing side, the third housing side, and the fourth housing side via a fourth pivotable coupling; the method comprising: configuring the fuel lighting device in a first configuration, configuring in the first configuration including: moving the first side and the second side to a first configuration first side position via the first pivotable coupling; moving the third side to a first configuration third side position via the second pivotable coupling; moving the fourth side to a first configuration fourth side position via the third pivotable coupling; and moving the rack to a first configuration rack position via the fourth pivotable coupling; wherein, in the first configuration, the first side, the second side, the third side, and the fourth side closeably form an enclosure bounding the rack, the enclosure enhancing ignition of fuel placed within the enclosure; and wherein the fuel lighting device is reconfigurable via the first pivotable coupling the second pivotable coupling, the third pivotable coupling, and the fourth pivotable coupling to a second configuration wherein the first side, the second side, the third side, the fourth side, and the rack are generally parallel, the device thereby having a generally thin profile.

To achieve the stated and other advantages of the present invention, as embodied and described below, the invention also includes a reconfigurable fuel lighting device attachable to a grill device, the reconfigurable fuel lighting device including: an ignition containment housing, the ignition containment housing having at least three sides and a bottom, the ignition containment housing being suspendable from the grill device, the grill device having at least three grill sides and a grill bottom; a rack for holding fuel, the rack being positionable above the ignition containment housing; and at least one door portion, the at least one door portion being arrangeable into at least two positions; wherein in a first one of the at least two positions, the at least one door portion is arranged in conjunction with at least two of the grill sides so as to form an enclosure, the enclosure including the rack, such that fuel is placeable within the enclosure above the rack and above the ignition containment housing.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 4 shows an overhead view of the two bottom tray portions of the second embodiment of the rearrangeable grill device of the present invention;

FIGS. 5A and 5B present views of the device of FIG. 4, arranged into the second configuration for charcoal lighting;

FIG. 6 shows the device of FIGS. 5A and 5B arranged into the third configuration for grilling;

FIG. 8 shows a side view of the device of FIG. 6 arranged into a first, folded configuration;

FIG. 9 shows the device of FIGS. 6 and 8 in a partially folded position between the third and first configurations;

FIG. 10 presents an end view of the folded configuration of the device of FIGS. 6 and 8;

DETAILED DESCRIPTION

Figure 1:
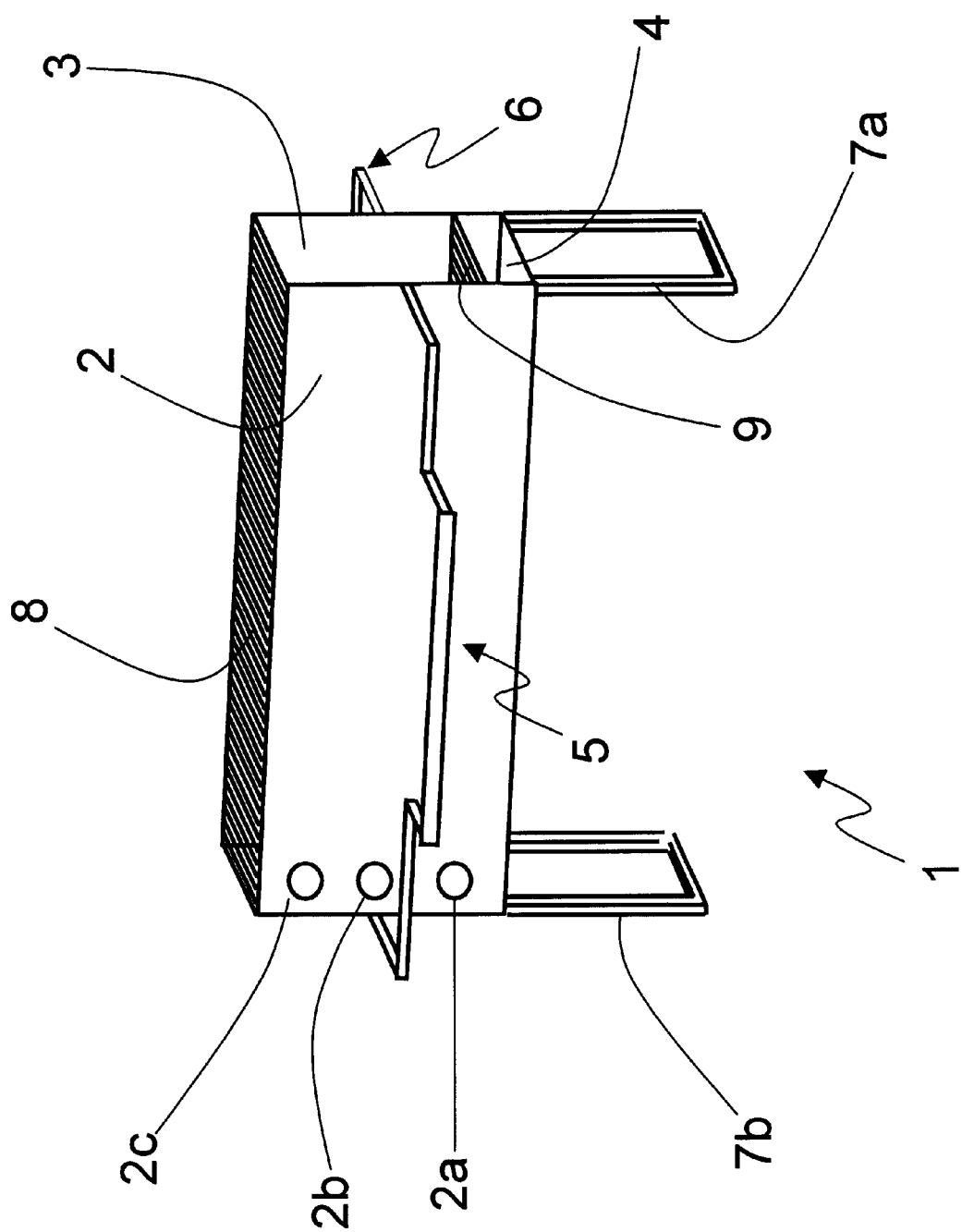
FIG. 1 presents the grill device configured for grilling in accordance with an embodiment of the present invention.

The present invention comprises several devices and methods for igniting charcoal or other fuel that incorporate features allowing the devices to be configured to provide a chimney for lighting of fuel and then reconfigured into or for use with grills.

A first embodiment comprises a reconfigurable combination grill and lighting device. A second embodiment comprises a variation on the first embodiment, also comprising a combination grill and lighting device. A third embodiment is a reconfigurable lighting device for use with an existing grill. A fourth embodiment is a reconfigurable lighting device modification to an existing grill.

The first embodiment comprises a device and method for igniting charcoal or other fuel that incorporates features allowing the device to be reconfigured to serve as a chimney for lighting of fuel and then reconfigured into a grill. The device is also reconfigurable into a generally flat profile that facilitates carrying and storage when not in use. From the flat position, handles incorporated into the device are pivoted or otherwise moved to a position approximately perpendicular to the two sides, and the two sides are in turn partially opened by pivoting upon, for example, hinges, so that the shape of the device forms a generally triangular shape. Arranging the device in this configuration also holds in place a triangle shaped grill trap door inside the device, upon which charcoal or other fuel is placed and under which newspaper or another easily ignited initiator for the fuel is positioned.

In operation, upon arrangement in the triangular configuration, the device is moved to an upright position, so that the device rests on one triangular end with the trap door toward the bottom and openings in one or more of the grill sides, also located near the bottom. In one embodiment, additional similarly located openings are also included in the grill bottom. The charcoal or other fuel is then placed into the device from the top, coming to rest on the trap door. The paper or other initiator is placed inside the device beneath the trap door. The paper is then lit through the openings at the base of the device. These openings, in addition to facilitating initial lighting of the paper, allow air to circulate freely, encouraging the efficient transfer of heat from the burning initiator to the charcoal or other fuel.

When the charcoal is sufficiently lit, attached legs are opened, by for example pivoting the legs on hinges or pivots, such as bolts or screws, that attach the legs to the bottom side of the grill, and the device is reoriented to rest on the extended legs. Using the handles, the two sides are pivotably or otherwise opened such that the sides are approximately perpendicular to the base, and the device thus assumes a generally U-shaped profile as formed by the sides and bottom of the grill, viewed from an end of the device. In an embodiment of the present invention, opening of the two sides also releases the trap door, allowing the trap door to collapse to a flat position against a bottom rack that contains the charcoal or other fuel when the grill is in the grilling configuration. The transfer of the fuel from the trap door to the bottom rack enables the charcoal or other fuel to be spread evenly over the bottom rack, facilitating even grilling. Lastly, in one embodiment, a separate grill top surface is emplaced so as to span the two opened sides over the lit fuel, completing the reconfiguration of the grill in a cooking position.

The second embodiment is a variation of the combination reconfigurable grill device of the first embodiment. The device of this embodiment includes two bottom tray portions coupled to each other via one or more pivotable couplings, such as hinges. Attached to each of the bottom tray portions is a handle, a door portion (also referred to as a side portion), and a leg portion. Pivotably attached to one of the bottom tray portions is a rack portion. The device also includes a separable top grill portion.

As with the first embodiment, the device of the second embodiment is configurable into a first arrangement, a second arrangement, and a third arrangement, the first arrangement having a thin profile to facilitate handling and storage of the device. However, in the second arrangement, instead of forming a generally triangular cross-sectional shape, the second embodiment of the grill device of the present invention forms a generally square cross-sectional shape. When arranged into the third arrangement, the two bottom tray portions are latched or locked into a flat arrangement using, for example, a catch. In one embodiment, the catch includes a hooked extension on a first tray portion and a slit opening in a second tray portion, such that, in the latched position, the hooked extension fits into the slit opening to lock the trays in the flat position.

The third embodiment of the present invention comprises a device and method for igniting charcoal or other fuel that incorporates features allowing the device to be configured to provide a chimney for lighting of fuel and then folded into an easily carried and stored configuration having a generally flat profile. From the flat position, a handle or handles incorporated into the device are pivoted or otherwise moved to a position approximately perpendicular to an adjacent side. The sides are then partially opened by pivoting upon, for example, hinges, so that the shape of the device forms a generally square cross-sectional shape bounded by the sides. Arranging the device in this configuration also allows a square shaped grill trap door to be surrounded by the sides of the device. Charcoal or other fuel is then placed on the trap door, and newspaper or another easily ignited initiator for the fuel is positioned beneath the trap door. A leg or other extension attached to the trap door holds the trap door in place generally perpendicular to the sides when the device is in the square shaped configuration.

In operation, upon arrangement in the square cross-sectional configuration, the device is moved to an upright position, so that the device rests on one end with the trap door toward the bottom, suspended by the leg or other extension, and openings in one or more of the device sides, also located near the bottom. The device is placed inside a grill or at another location that will hold the charcoal upon being lit. The paper or other initiator is then placed inside the device beneath the trap door, and the charcoal or other fuel is placed into the device from the top, coming to rest on the trap door. The paper is then lit through the openings at the base of the device. These openings, in addition to facilitating initial lighting of the paper, allow air to circulate freely, encouraging the efficient transfer of heat from the burning initiator to the charcoal or other fuel.

When the charcoal is sufficiently lit, the device is simply lifted by its handle, allowing the trap door to swing downward via, for example hinges attaching the trap door by one side. The leg or other extension, which is also pivotable, similarly swings downward, allowing the lit charcoal to dump from the bottom of the device into the grill or other location for containing the lit charcoal.

The fourth embodiment is a reconfigurable lighting device modification to an existing grill. In this embodiment, the lighting device includes an initiator holding tray portion, a rack top trap door, and a two piece fuel containment portion. The two piece fuel containment portion includes two pivotably connected doors that are arrangeable within an existing grill having grill sides so as to form a containment area within the existing grill above the initiator holding tray. A trap door rack is located on the top of the initiator holding tray. In use, fuel initiator is placed within the initiator holding tray portion, which includes openings for allowing lighting of the initiator and air flow to the initiator. The trap door rack top for the initiator holding tray is placed or pivotably moved so as to cover the initiator holding tray portion, and the pivotably connected doors are arranged and connected to the existing grill sides so as to form a fuel containment area within a corner of the existing grill. In one embodiment, the pivotably connected doors are connected to the existing grill sides using one or more locator pins. Fuel, such as charcoal, is then placed in the fuel containment area, and the initiator is ignited, such that the fuel is able to light. Upon lighting of the fuel, the pivotably connected doors are repositioned, so that the lit fuel is dispersed within the existing grill and grilling can begin.

In one embodiment, the existing grill is altered for use with the second embodiment of the lighting device of the present invention. In this embodiment, an opening is made, such as by cutting, in one corner area of the bottom of the existing grill. The initiator holding tray portion is then attached to the existing grill, so as to be suspended beneath the bottom of the existing grill. In one embodiment, the initiator holding tray portion is detachable, to allow, for example, more compact storage of the altered existing grill device.

In one embodiment, the two pivotably connected doors are connected to the existing grill bottom by a second pivotable connection via one of the two doors. In this embodiment, the pivotably connected doors are moveable to two positions. In a first position, the two doors are pivoted so as to be perpendicular to the existing grill bottom. A first door is pivotably attached to the bottom, and the second door is pivotably attached to the first door. The second door is pivoted relative to the first door, so that the two doors are positioned at an approximately right angle to one another. The second door is attached to a side of the existing grill, and the two connected doors in conjunction with two adjacent sides of the existing grill form a generally square cross sectional containment subportion of the grill area in one corner of the existing grill bottom. In a second position, the first and second doors are coplanar, parallel to the grill bottom, and adjacent the grill bottom; thus, the two doors rest on top of the grill bottom and adjacent one another in this position.

References will now be made in detail to embodiments of the present invention, examples of which are illustrated in the accompanying drawings.

FIG. 1 presents the grill device of the first embodiment configured for grilling in accordance with an embodiment of the present invention. As shown in FIG. 1, the grill 1, as arranged or configured for grilling, includes grill sides 2, 3 and grill bottom 4, handles 5, 6, legs 7a, 7b, a grill surface 8, and a bottom rack 9 to support fuel, such as charcoal. In this embodiment, the grill 1 is arranged so that the legs 7a, 7b are extended to support the grill 1, and the handles 5, 6 are moved to a position extending approximately perpendicularly to the sides 2, 3, for example, to facilitate easy handling of the grill 1. In one embodiment, the grill surface 8 comprises a separable component placeable in the position shown in FIG. 1 when the grill 1 is arranged for grilling. In another embodiment, the grill surface 8, is pivotably or otherwise movably linked to the grill 1, such as by attachment to one or more of the grill sides 2, 3. In an embodiment of the present invention, the portions of the grill 1, other than the grill surface 8, are movably or pivotably linked, such as by bolts, hinges, or screws, to allow the grill 1 to be arrangeably configured in various positions, such as the grilling arrangement shown in FIG. 1.

In one embodiment, the handles 5, 6 and legs 7a, 7b are rotatably positionable and are held in place via, for example, frictional attachment devices, such as bolts and nuts or screws, and optionally further including features for locking the handles 5, 6 and legs 7a, 7b in various positions, as appropriate for each of the various arrangements of the device, and extensions, brackets, or other features are included to support the various moveable or pivotable components when located in fixed positions for the various arrangements. In an embodiment of the present invention, the sides 2, 3, and optionally the bottom 4 include one or more openings 2a, 2b, 2c and in one embodiment, some of the components, such as the legs and one or more pivoting grill portions, such as the grill surface 8, are biasedly attached, such as by a spring, to facilitate movement or pivoting among positions.

Figure 2A:
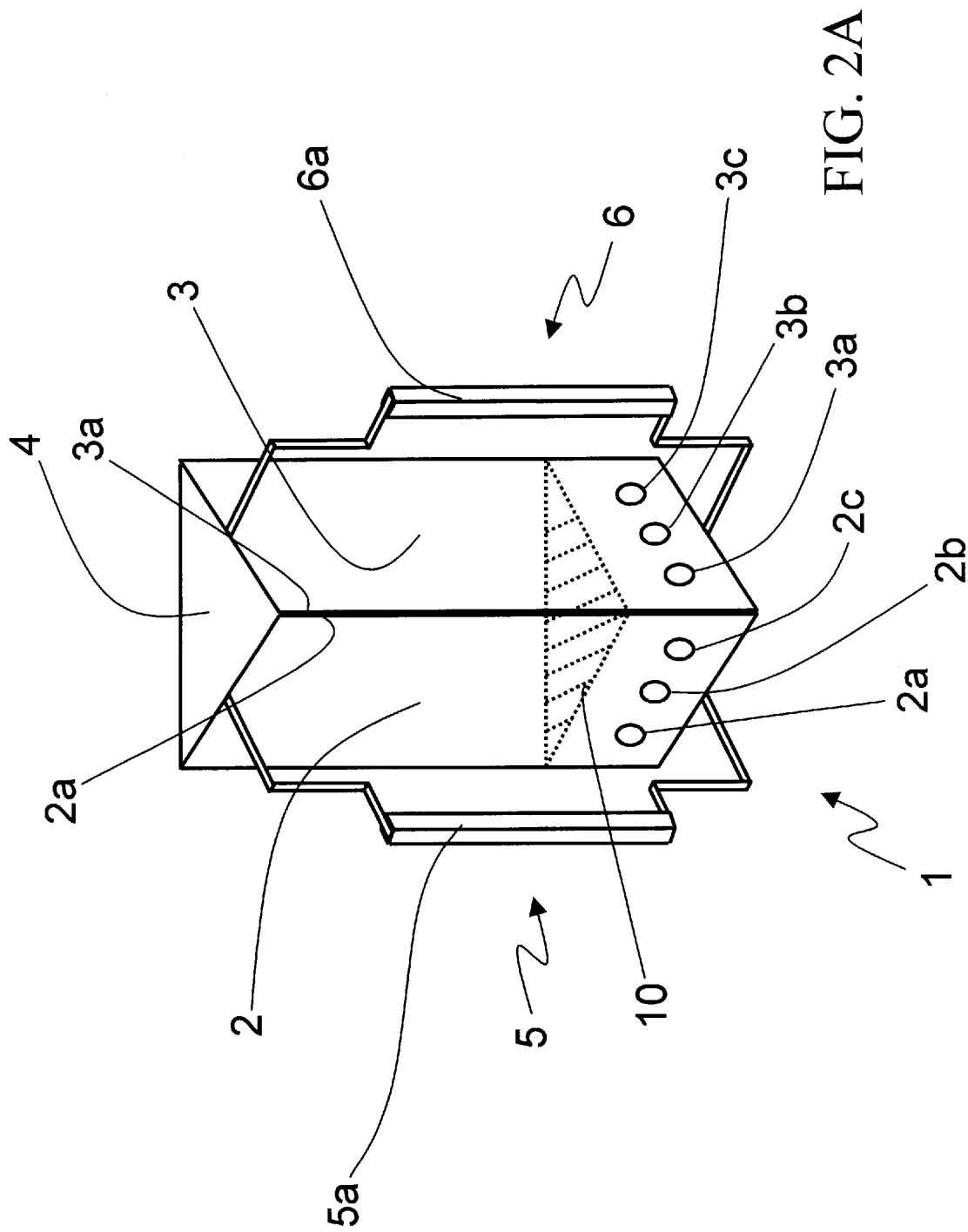
FIGS. 2A and 2B present views of the grill configured for lighting of fuel, such as charcoal, in accordance with an embodiment of the present invention.
Figure 2B:
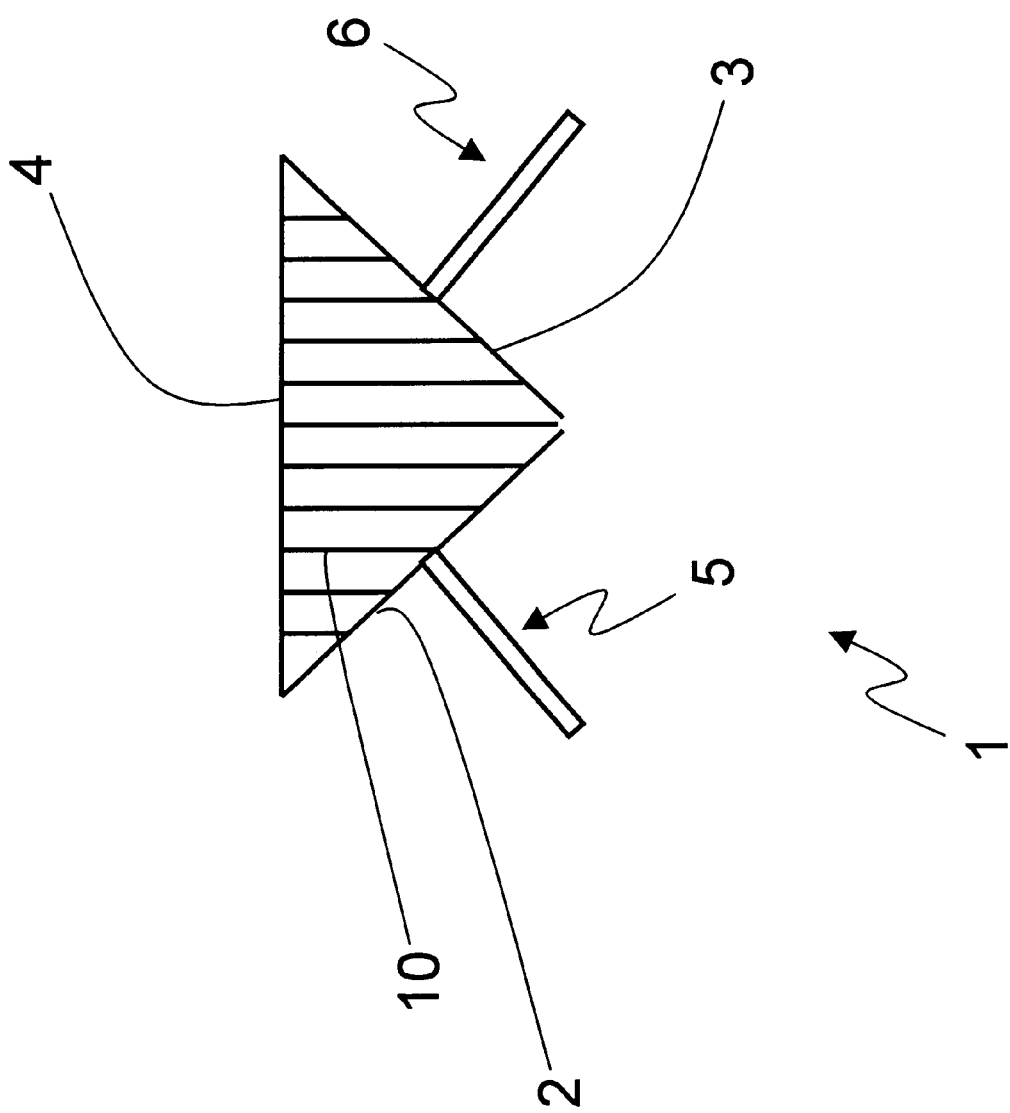

FIGS. 2A and 2B present views of the grill configured for lighting of fuel, such as charcoal, in accordance with an embodiment of the present invention. As shown in FIG. 2A, the grill 1 is arranged such that the sides 2, 3, and bottom 4 form a triangular, closed unit, with openings 2a, 2b, 2c, 3a, 3b, 3c oriented near the bottom of the standing grill device 1, as shown in FIG. 2A. In the lighting arrangement, grill sides 2, 3 are movably relocated, such as via pivoting devices, such that edges 2a, 3a of sides 2, 3 are positioned in close proximity.

FIG. 2B presents an overhead view of the grill arrangement of FIG. 2A. As shown in FIG. 2B, the triangular shape of this configuration of the grill 1 is formed by the sides 2, 3 and the bottom 4. A moveable fuel rack 10, such as a triangularly shaped rack, as shown in outline in FIG. 2A and as shown in FIG. 2B, is positioned within the enclosed triangular grill arrangement above the position of the openings 2a, 2b, 2c, 3a, 3b, 3c, as shown in FIG. 2A. In an embodiment of the present invention, the triangular shaped rack 10 is pivotably or otherwise moveable to the position shown in FIGS. 2A and 2B, and is pivotably or otherwise moveable so as to be approximately parallel to the bottom rack 9 in the configuration shown in FIG. 1. In an embodiment of the present invention, the triangular rack 10 has attached pivots, hinges, or other devices for allowing pivoting or movement, these devices being located on one of the sides of the triangular rack 10 and also being attached to the bottom of the grill device 4, and extensions, brackets, or other support devices are located on one or more of the sides of the grill device 2, 3 in order to support the pivoted triangular rack 10 when in the lighting position shown in FIGS. 2A and 2B.

In operation for lighting of fuel, such as charcoal, in the arrangement shown in FIGS. 2A and 2B, the fuel is placed on top of the triangular rack 10, and ignition of the fuel occurs via use of the openings 2a, 2b, 2c, 3a, 3b, 3c, such as by placement of an easily combustible fuel starter, such as crumpled paper beneath the triangular rack 10, as shown in FIG. 2A. The fuel starter is ignited, such as by a match or other source of ignition, and the ignited fuel starter in turn ignites the fuel on top of the triangular rack 10. The openings 2a, 2b, 2c, 3a, 3b, 3c allow the fuel starter to be ignited, such as by inserting the match through one of the openings 2a, 2b, 2c, 3a, 3b, 3c. The openings 2a, 2b, 2c, 3a, 3b, 3c also enhance ignition of the fuel by allowing an air flow to the fuel.

In an embodiment of the present invention, the grill handles 5, 6 include an insulated section 5a, 6a, respectively, such as sections made of wood, to prevent burning during handling of the grill 1 following the lighting of the fuel.

Figure 3:
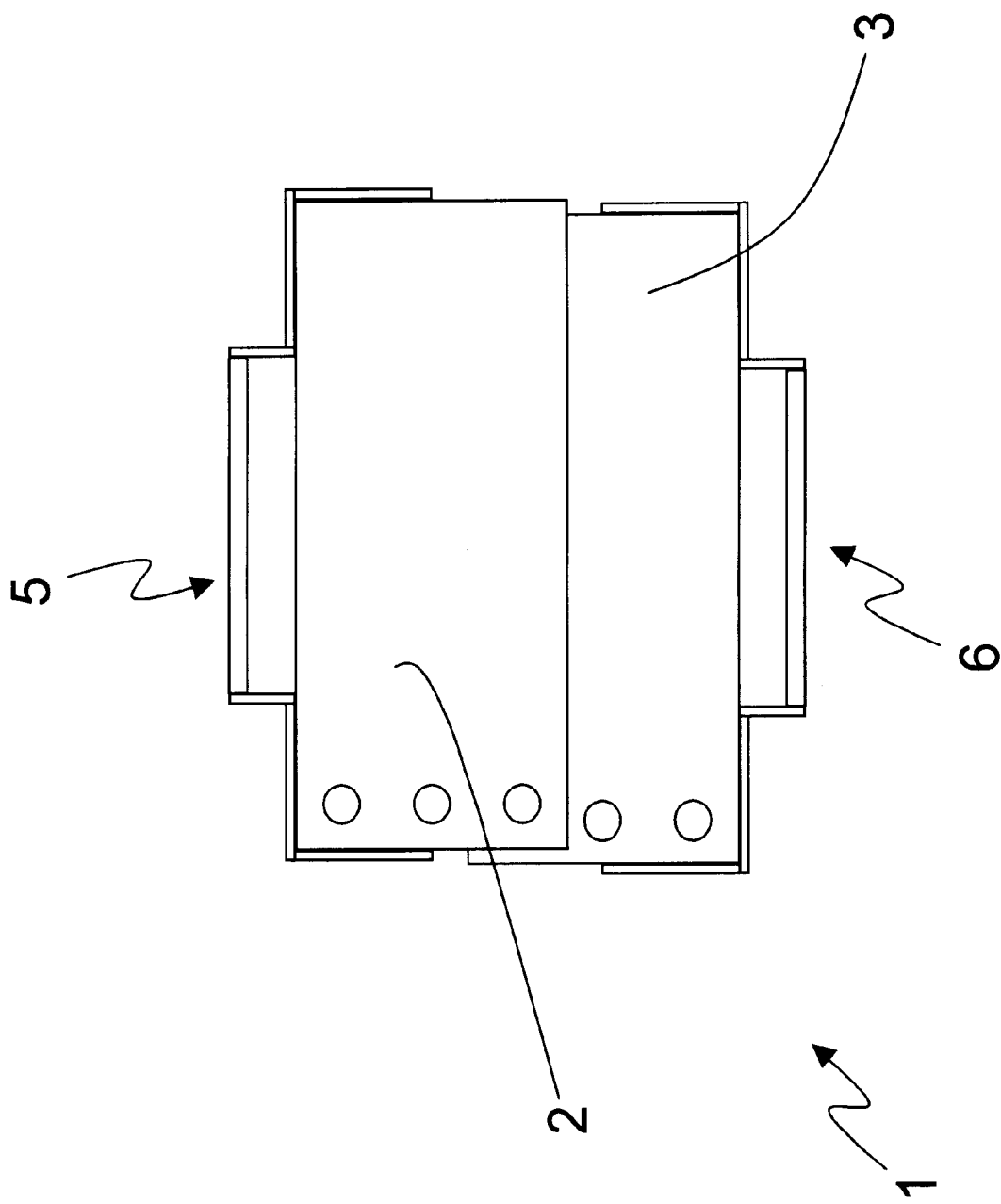
FIG. 3 is a view of the grill in a folded configuration for carrying, storage, and other handling in accordance with an embodiment of the present invention.

FIG. 3 is a view of the grill in a folded configuration for carrying, storage, and other handling in accordance with an embodiment of the present invention. As shown in FIG. 3, the folded grill 1 has closed and overlapping sides 2, 3 and handles 5, 6 pivotably moved to the ends of the sides 2, 3, allowing, for example, reduced storage size and easy carrying and handling. In one embodiment, the separate grill surface 8 is contained within the interior of the folded grill. In an embodiment of the present invention, the grill includes latching devices or other features for biasedly maintaining the grill 1 in the folded configuration shown in FIG. 3.

FIG. 4 shows an overhead view of the two bottom tray portions of the second embodiment of the rearrangeable grill device of the present invention. As shown in FIG. 4, the two bottom tray portions 21, 22 are pivotably connected via one or more couplings 23, 24, such as hinges.

Figure 5B:
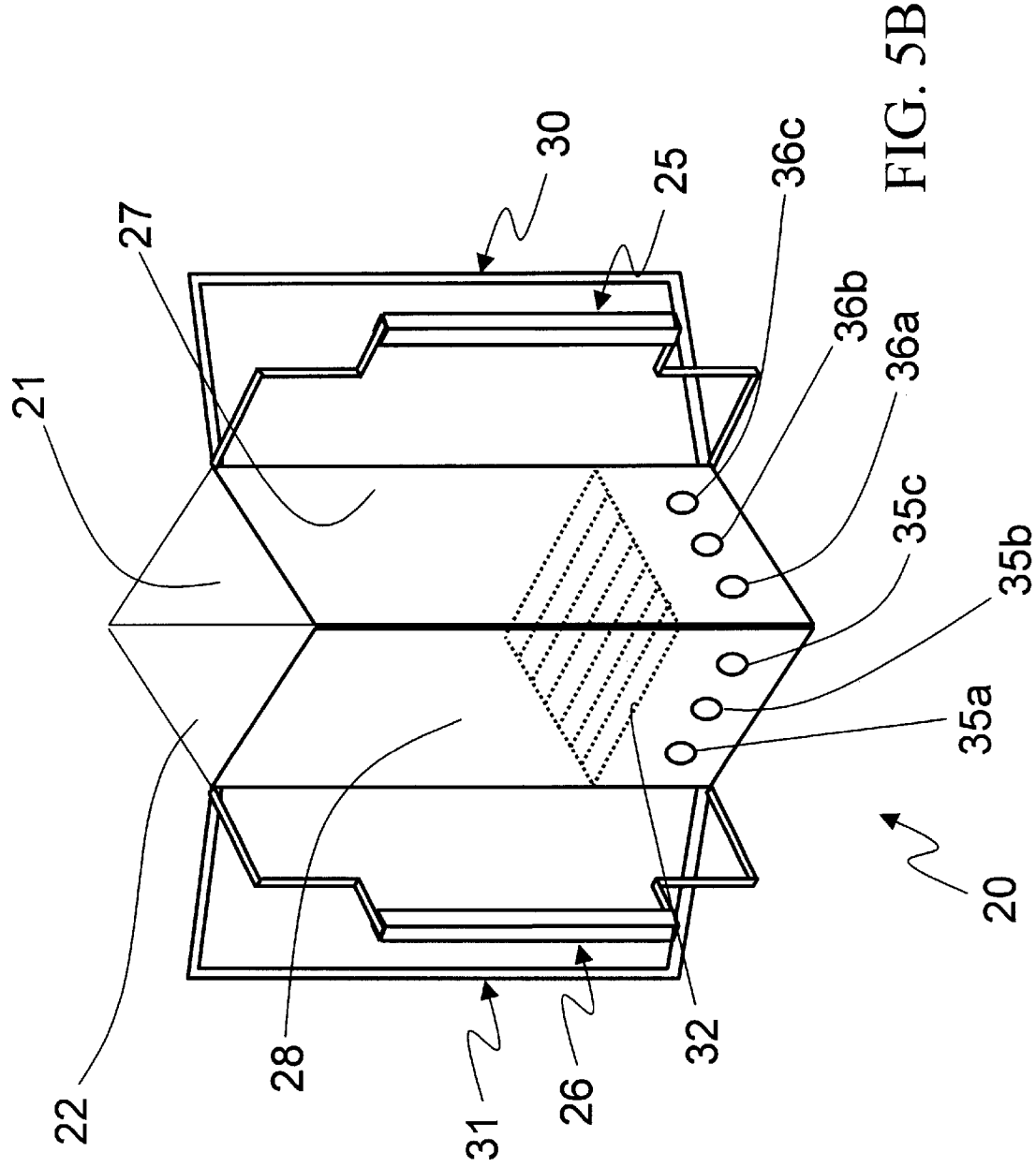

FIGS. 5A and 5B present views of the device of FIG. 4, arranged into the second configuration for charcoal lighting. As shown in FIG. 5A, an overhead view of the device 20, and FIG. 5B, a perspective view of the device 20, the two bottom tray portions 21, 22 have been arranged at an approximately right angle relative to each other, via the pivotable couplings 23, 24. Attached to each of the bottom tray portions 21, 22, are handles 25, 26, respectively, door portions 27, 28, respectively, and leg portions 30, 31, respectively. Each of the handles, 25, 26, the door portions 27, 28, and the leg portions 30, 31 are movable relative to the bottom tray portions 21, 22. Pivotably attached to one of the bottom tray portions 21 is a rack portion 32.

As further shown in FIGS. 5A and 5B, the two bottom tray portions 21, 22 and the two door portions 27, 28 have been positioned so as to form a four sided closed shape. The rack portion 32 is pivotably moved so as to form a ledge within the grill device 20, so as to support fuel placed on the rack portion 32. In an embodiment of the present invention, the rack portion 32, when placed so as to support fuel, rests on an extension extending from the second bottom tray portion 22, the extension being, for example, a reversed hinge, the hinge being lockable in an extended position to support the rack portion 32, and the hinge being further pivotable to a folded position against the second bottom tray portion 22 when the hinge is not extended to support the rack portion 32. Openings 35a, 35b, 35c, 36a, 36b, 36c facilitate lighting of fuel initiator placed below the rack portion 32 and allow air flow to the fuel initiator and the fuel.

FIG. 6 shows the device 20 of FIGS. 5A and 5B arranged into the third configuration for grilling. As shown in FIG. 6, the legs 30, 31 provide support for the grill 20, with handles 25, 26 positioned as shown, and separate grill surface rack 40 spanning and supported by the door/side portions 27, 28. The two bottom tray portions 21, 22 are aligned in the same plane via pivoting, and latched or locked together using, for example, a latch 39. In one embodiment, the latch 39 comprises a bent metal extension attached to one of the bottom tray portions 21 via a first end of the latch 39. The second end of the latch 39 includes a bent end portion that is insertable into an opening in the second bottom tray portion 22 when the two bottom tray portions 21, 22 are arranged as shown in FIG. 6. The latch 39 thus latches the two bottom tray portion 21, 22 together when in the third configuration.

Figure 7A:
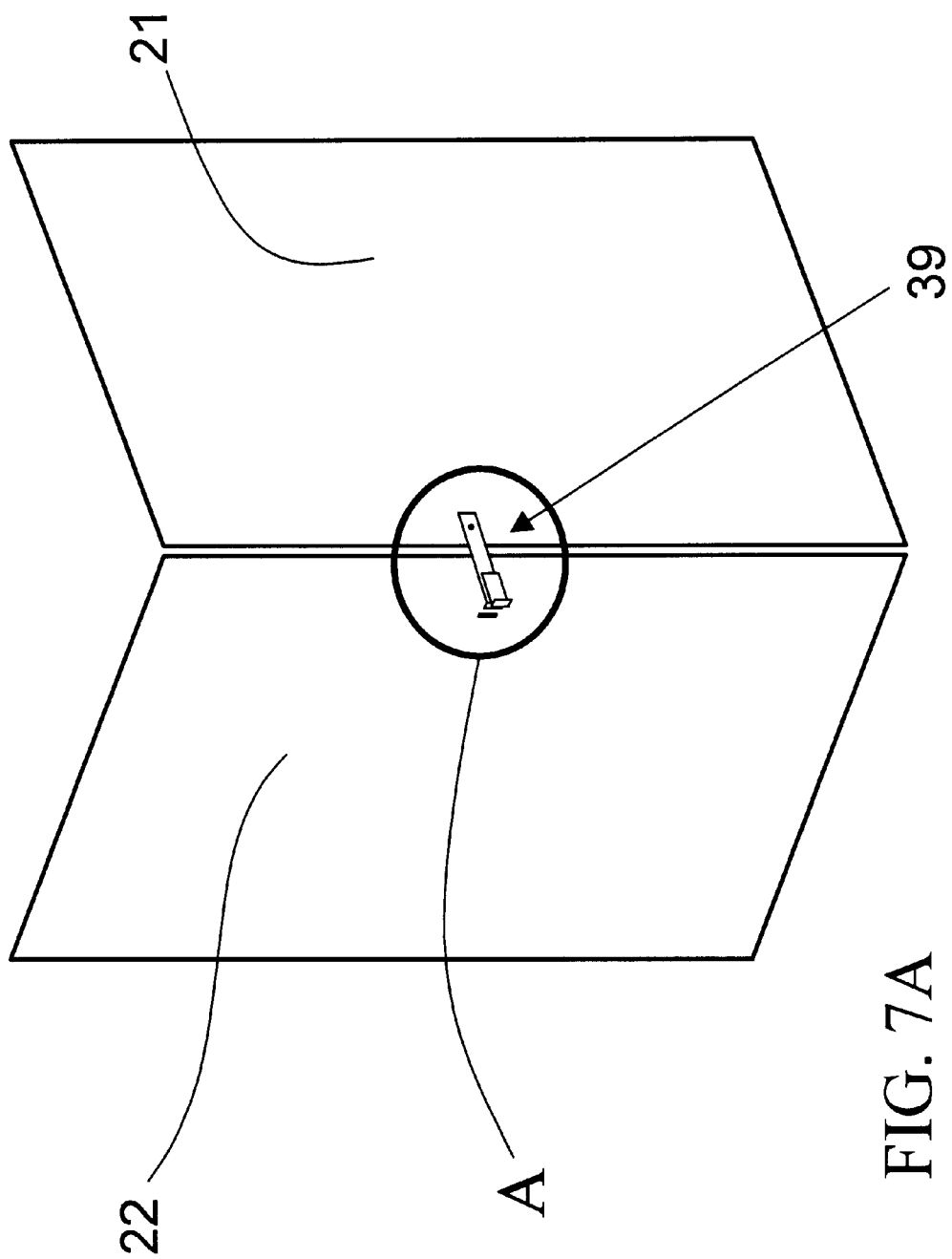
FIGS. 7A and 7B present the latch and a closeup of the latch, respectively, in accordance with an embodiment of the present invention.
Figure 7B:
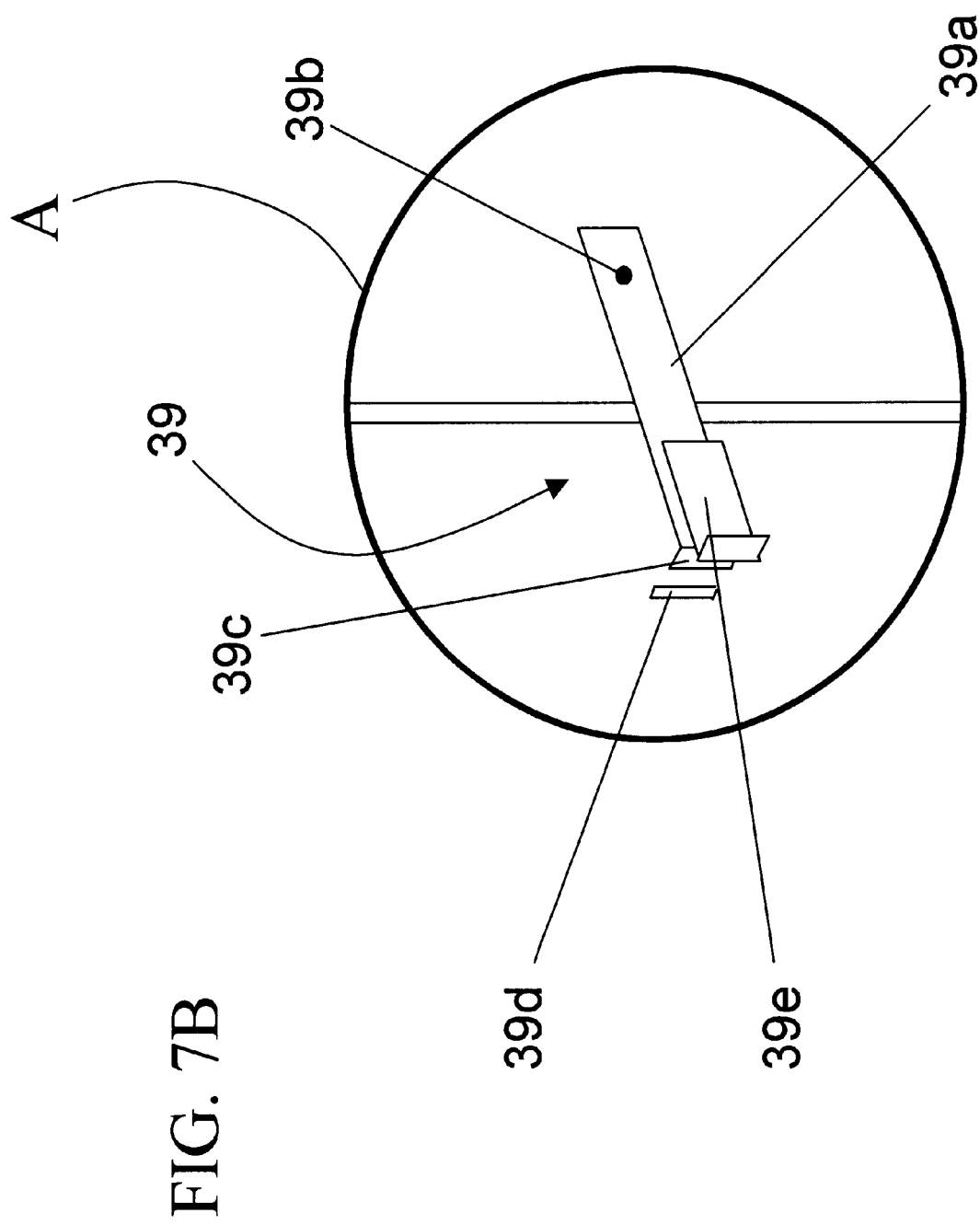

FIGS. 7A and 7B present the latch and a closeup of the latch, respectively, in accordance with an embodiment of the present invention. As shown in FIGS. 7A and 7B, the latch 39 includes a main body portion 39a connected at a first end to one of the bottom tray portions 21 via a connector 39b, such as a rivet, screw, or bolt. At the second end of the main body portion 39a is a bent end portion 39c for insertion into a slot 39d in the second bottom tray portion 22. Also attached to the main body portion 39a, is a handle portion 39e.

FIG. 8 shows a side view of the device 20 of FIG. 6 arranged into the first, folded configuration. As shown in FIG. 8, the handle 25 is retracted, and the leg 30 is pivotably folded so as to abut the bottom tray portion 21. In one embodiment, the handle 25 is held to the bottom tray portion 21 by two or more brackets 25a, 25b, 25c, 25d. The handle 25 is extendable and retractable relative to the bottom tray portion 21 via, for example, sliding within the brackets 25a, 25b, 25c, 25d.

FIG. 9 shows the device 20 of FIGS. 6 and 8 in a partially folded position between the third and first configurations. FIG. 10 presents an end view of the folded configuration of the device 20 of FIGS. 6 and 8.

Figure 11A:
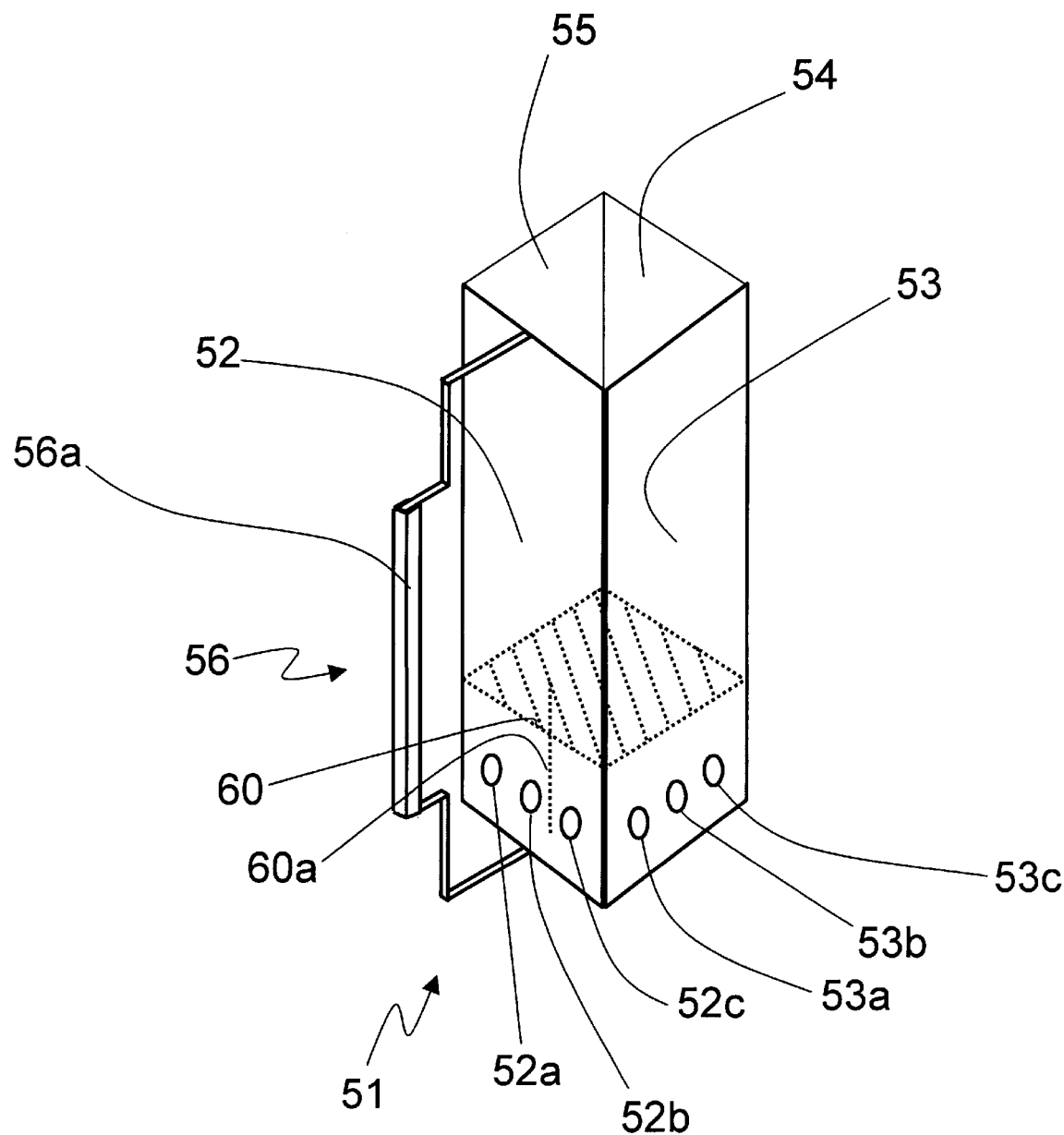
FIG. 11A presents a charcoal lighting device configured for lighting charcoal in accordance with a third embodiment of the present invention.
Figure 13A:
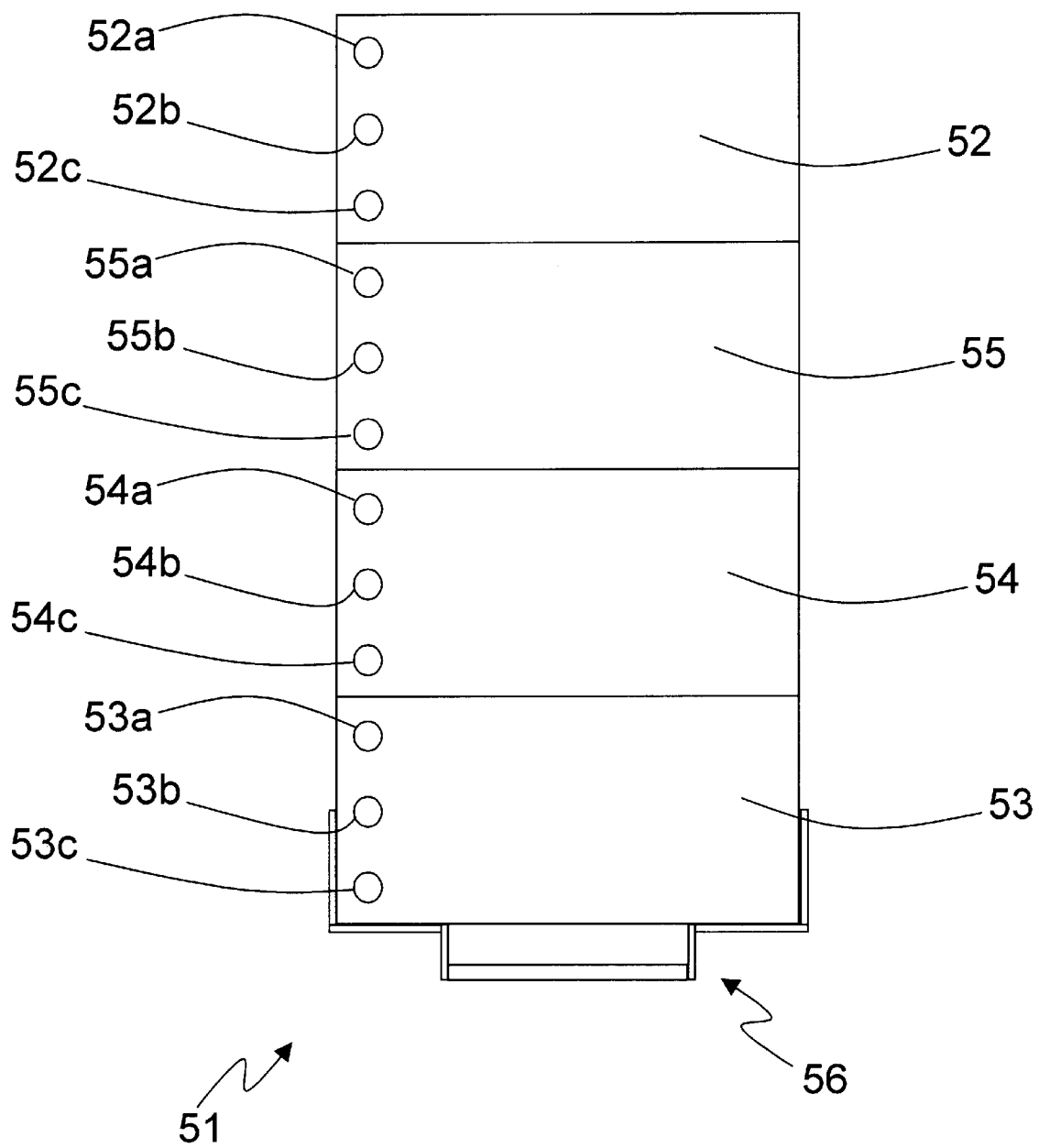
FIG. 13A presents a view of one side of the lighting device of FIGS. 11A and 11B configured with all four sides extended flat.

FIG. 11A presents the lighting device of the third embodiment of the present invention configured for lighting. As shown in FIG. 11A, the grill 51, as arranged or configured for lighting, includes sides 52, 53, 54, 55 handle 56, and a trap door bottom rack 60 to support fuel, such as charcoal. The device 51 also includes openings 52a, 52b, 52c, 53a, 53b, 53c in the sides 52, 53, as well as openings 54a, 54b, 54c, 55a, 55b, 55c in sides 54, 55, as best seen in FIG. 13A. In this embodiment, the device 51 is arranged so that the trap door bottom rack 60, as shown in outline in FIG. 11A, is held generally perpendicular to the sides 52, 53, 54, 55 by a leg or other extension 60a. The handle 56 is moved so as to extend generally perpendicularly to adjacent side 52, for example, to facilitate easy handling of the device 51. In an embodiment of the present invention, the portions of the device 51, are movably or pivotably linked, such as by bolts, hinges, or screws, to allow the device 51 to be arrangeably configured in various positions, such as the lighting arrangement shown in FIG. 11A.

In one embodiment, the handle 56 is rotatably positionable and are held in place via, for example, frictional attachment devices, such as bolts and nuts or screws, and optionally further including features for locking the handle 56 in different positions, as appropriate for each of the various arrangements of the device, and extensions, brackets, or other features are included to support the various moveable or pivotable components when located in fixed positions for the various arrangements.

Figure 11B:
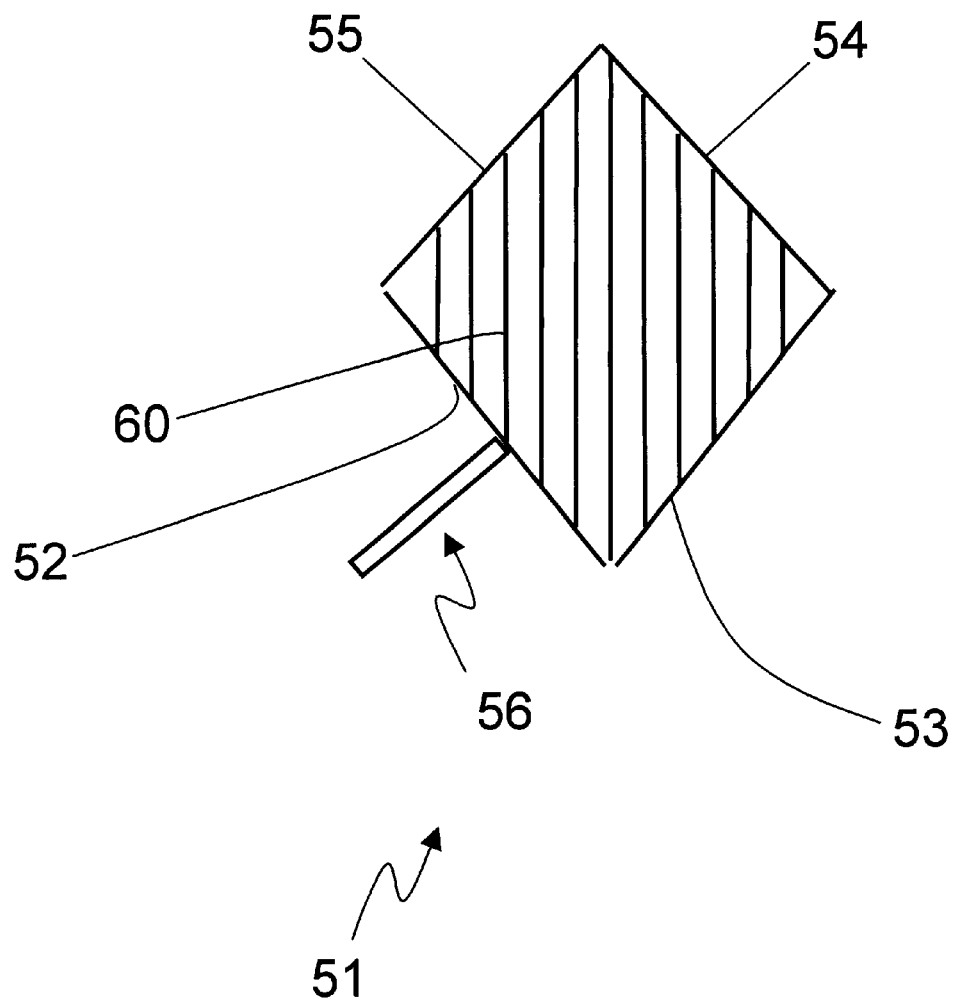
FIG. 11B shows an overhead view of the charcoal lighting device configured in accordance with the embodiment of FIG. 11A.

FIG. 11B presents an overhead view of the device of FIG. 11A, as configured for lighting. As shown in FIG. 11B, the square shape of this configuration of the device 51 is formed by the sides 52, 53, 54, 55, with an edge of side 52 and an edge of side 53 forming a corner. The moveable trap door fuel rack 60, such as a square shaped rack, as shown in outline in FIG. 11A and as shown in FIG. 11B, is positioned within the enclosed square arrangement of the sides 52, 53, 54, 55 above the position of the openings 52a, 52b, 52c, 53a, 53b, 53c, as shown in FIG. 11A. In an embodiment of the present invention, the square shaped rack 60 is pivotably or otherwise moveable to the position shown in FIGS. 11A and 11B, and is pivotably or otherwise moveable so as to be approximately parallel to one of the sides 52, 53, 54, 55 upon the device 51 being placed in the folded, thin profile configuration. In an embodiment of the present invention, the square rack 60 has attached pivots, hinges, or other devices for allowing pivoting or movement, these devices being located on one of the edges of the rack 60 and also being attached to one of the sides 52, 53, 54, 55 of the device 51, and extensions, brackets, or other support devices are located on one or more of the sides 52, 53, 54, 55 in order to support the pivoted rack 60 on one edge when in the lighting position shown in FIGS. 11A and 11B. The pivoted rack 60 is also supported by a leg or other extension 60a, as shown in outline in FIG. 11A.

In operation for lighting of fuel, such as charcoal, in the arrangement shown in FIGS. 11A and 11B, the fuel is placed on top of the rack 60, and ignition of the fuel occurs via use of the openings 52a, 52b, 52c, 53a, 53b, 53c, such as by placement of an easily combustible fuel starter, such as crumpled paper beneath the rack 60, as shown in FIG. 11A. The fuel starter is ignited, such as by a match or other source of ignition, and the ignited fuel starter in turn ignites the fuel on top of the rack 60. The openings 52a, 52b, 52c, 53a, 53b, 53c allow the fuel starter to be ignited, such as by inserting the match through one of the openings 52a, 52b, 52c, 53a, 53b, 53c. The openings 52a, 52b, 52c, 53a, 53b, 53c also enhance ignition of the fuel by allowing an air flow to the fuel.

In an embodiment of the present invention, the handle 56 includes an insulated section 56a such as a section made of wood, to prevent burning of the user during handling of the grill 51 following the lighting of the fuel.

Figure 12:
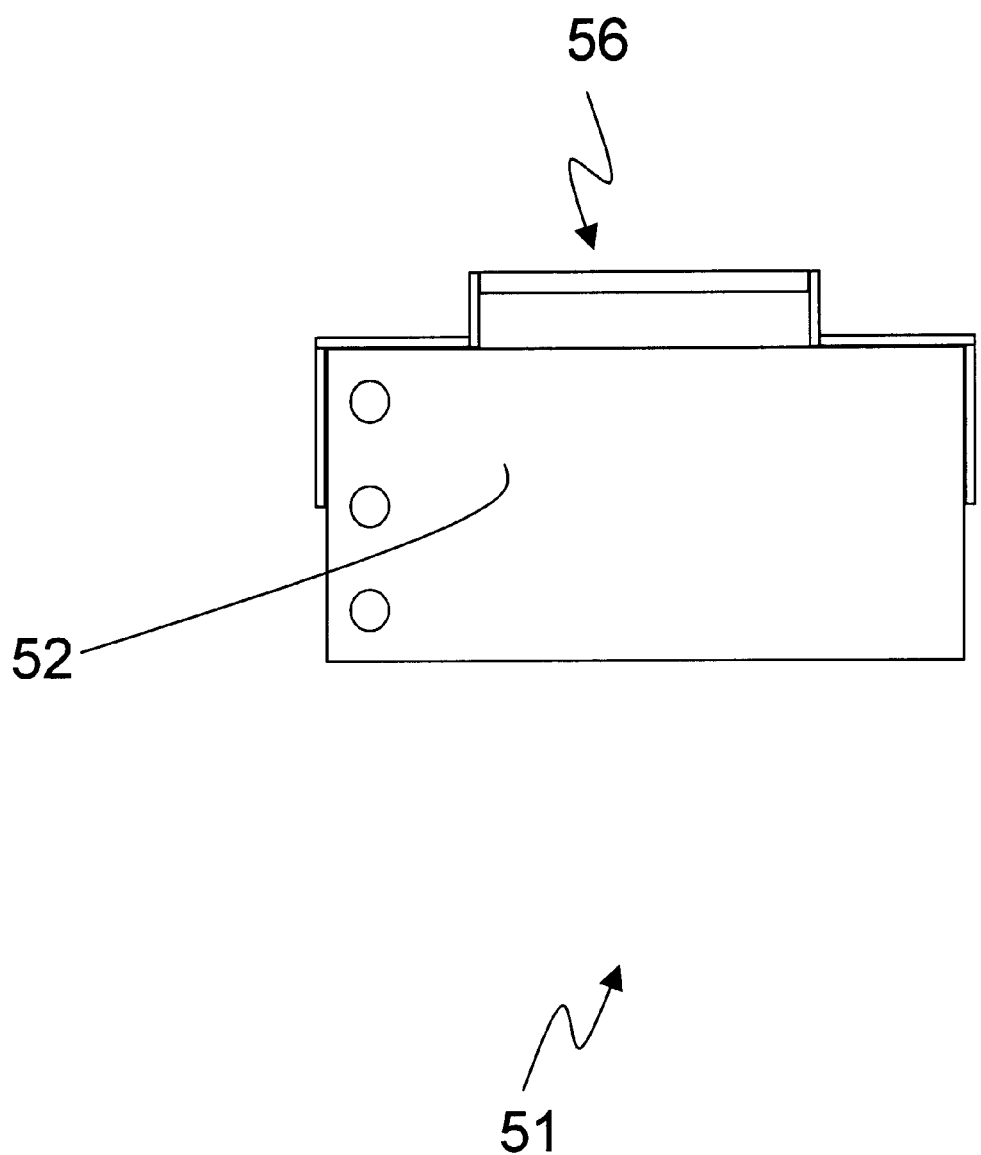
FIG. 12 is a view of the lighting device in a folded configuration for carrying, storage, and other handling in accordance with the embodiment of FIGS. 11A and 11B.

FIG. 12 is a view of the device of FIGS. 11A and 11B in a folded configuration for carrying, storage, and other handling in accordance with an embodiment of the present invention. As shown in FIG. 12, the folded device 51 has a closed and overlapping side 52 and a handle 56 pivotably moved to the end of the side 52, allowing, for example, reduced storage size and easy carrying and handling. In an embodiment of the present invention, the device includes latching or other features for biasedly maintaining the device 51 in the folded configuration shown in FIG. 12.

Figure 13B:
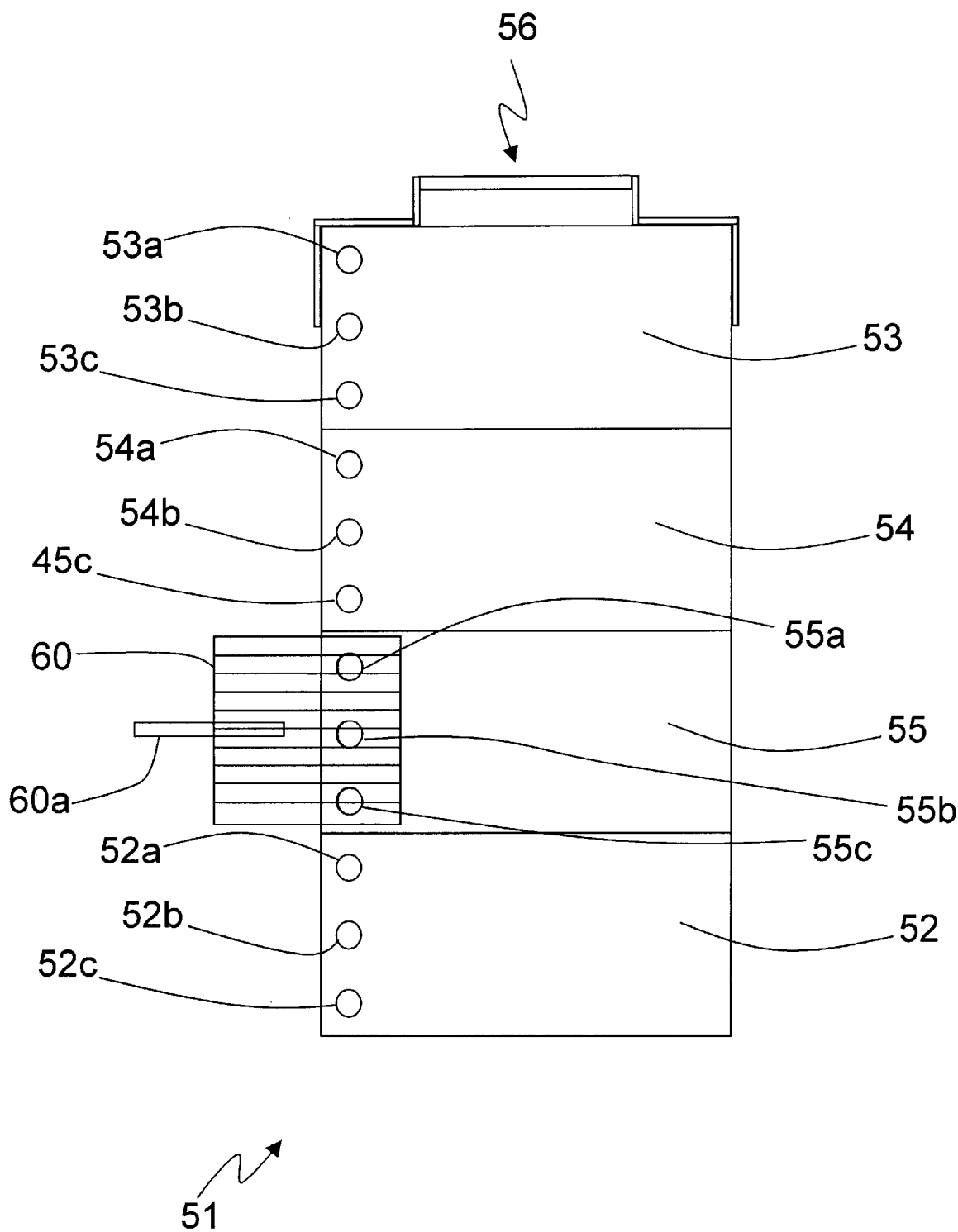
FIG. 13B presents a view of the reverse side of the device configuration of FIG. 13A.
Figure 13C:
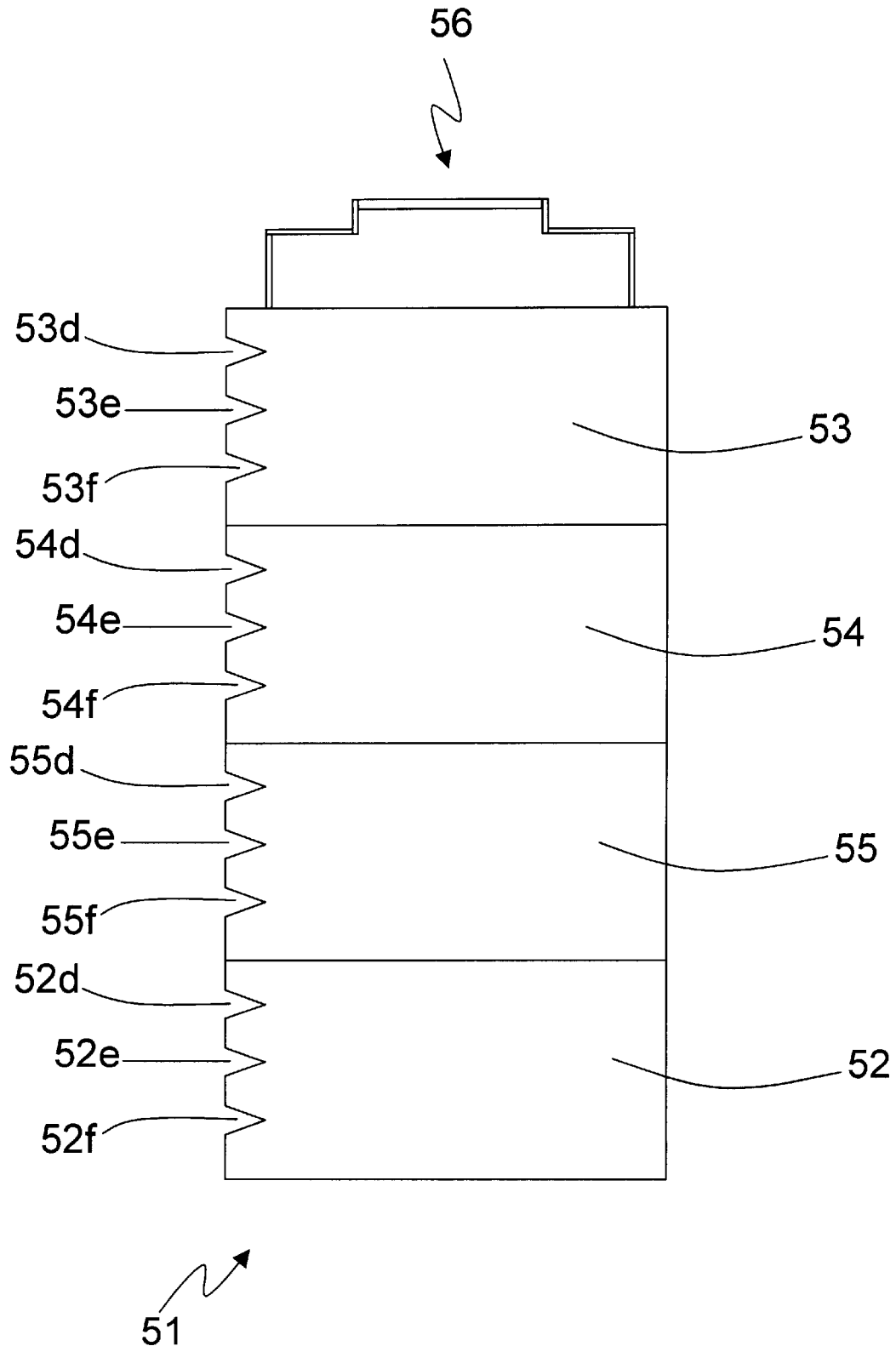
FIG. 13C presents another embodiment of the lighting device as configured in FIG. 13A, the embodiment having angle cut edges, rather than circular openings for lighting and air flow.

FIG. 13A presents a view of the device 51 of FIGS. 11A and 11B in a fully unfolded position with each of the sides 52, 53, 54, 55 extended. As shown in the embodiment of FIG. 13A, the sides 52, 53, 54, 55 include openings 52a, 52b, 52c, 53a, 53b, 53c, 54a, 54b, 54c, 55a, 55b, 55c, respectively. FIG. 13B shows the reverse side of the embodiment of FIG. 13A, with rack 60 and attached leg 60a extended from side 55. FIG. 13C is an embodiment of the device 51, in which angled slots 52d, 52e, 52f, 53d, 53e, 53f, 54d, 54e, 54f, 55d, 55e, 55f are provided is sides 52, 53, 54, 55 for lighting and air flow, rather than round openings.

Figure 14:
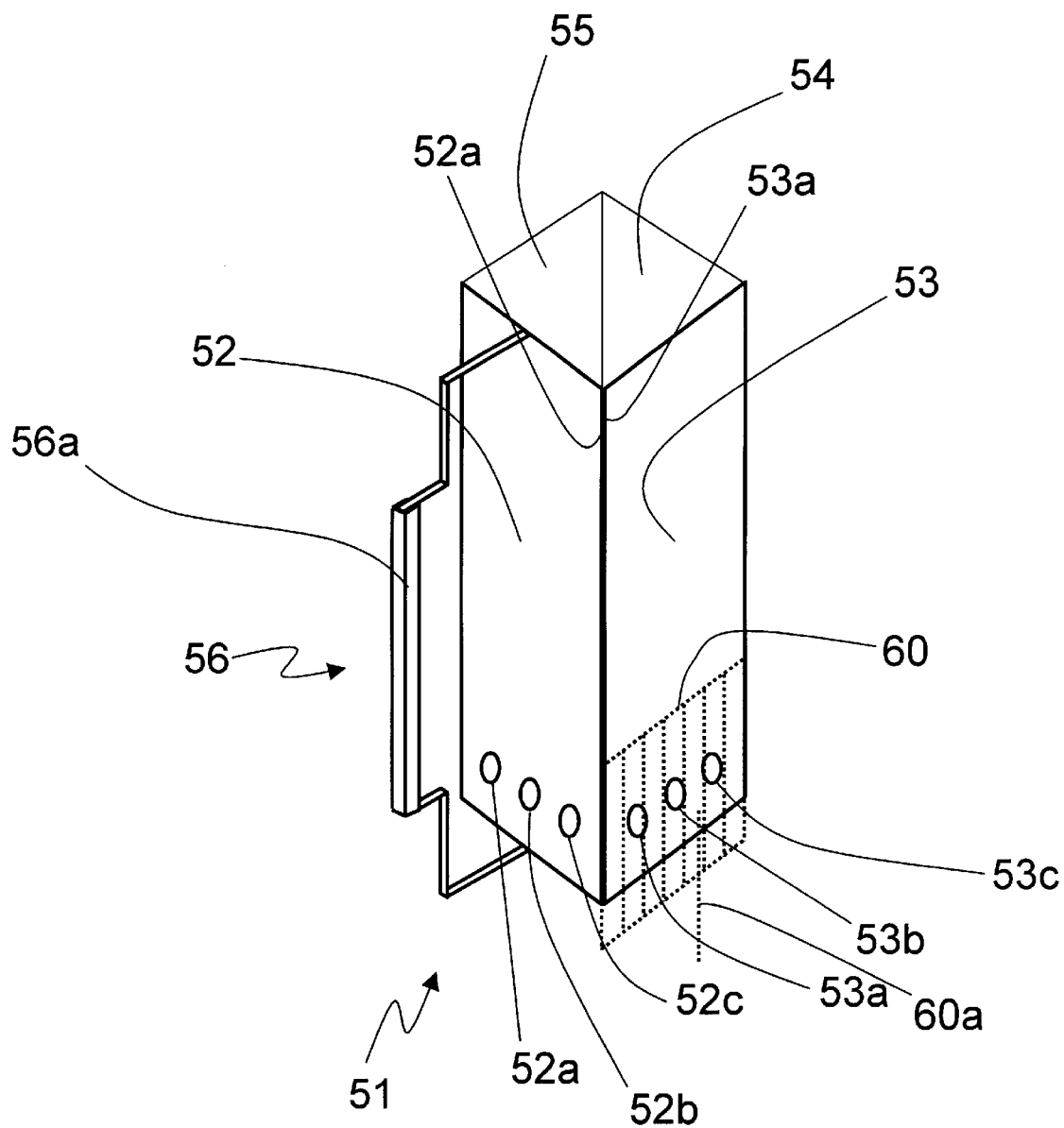
FIG. 14 shows an embodiment of the lighting device of FIGS. 11A and 11B with the rack for holding charcoal during lighting collapsed for release of the lit charcoal.

FIG. 14 shows the embodiment of FIGS. 11A and 11B with the rack 60 and attached leg 60a shown in the released position, occurring, for example, following the release of fuel after lighting. In the position shown in FIG. 11A, the attached leg 60a supports the rack 60 in a position generally perpendicular to sides 52, 53, 54, 55, with the device 51 resting on the ends of the sides 52, 53, 54, 55, at the lower end of the device 51, as shown in FIG. 11A. During lighting, fuel, such as charcoal, is placed above the rack 60, as shown in FIG. 11A. To reach the position shown in FIG. 14, the device 51 is lifted by the handle 56, and the rack 60 pivots to the position shown in FIG. 14, such that the rack 60 is generally approximately parallel with side 53. Attached leg 60, also pivots, such that it extends downward, as shown in FIG. 4. The pivoting of the rack 60 and attached leg 60a results in release of the fuel from the lower end of the device 51, as shown in FIG. 14.

Figure 15:
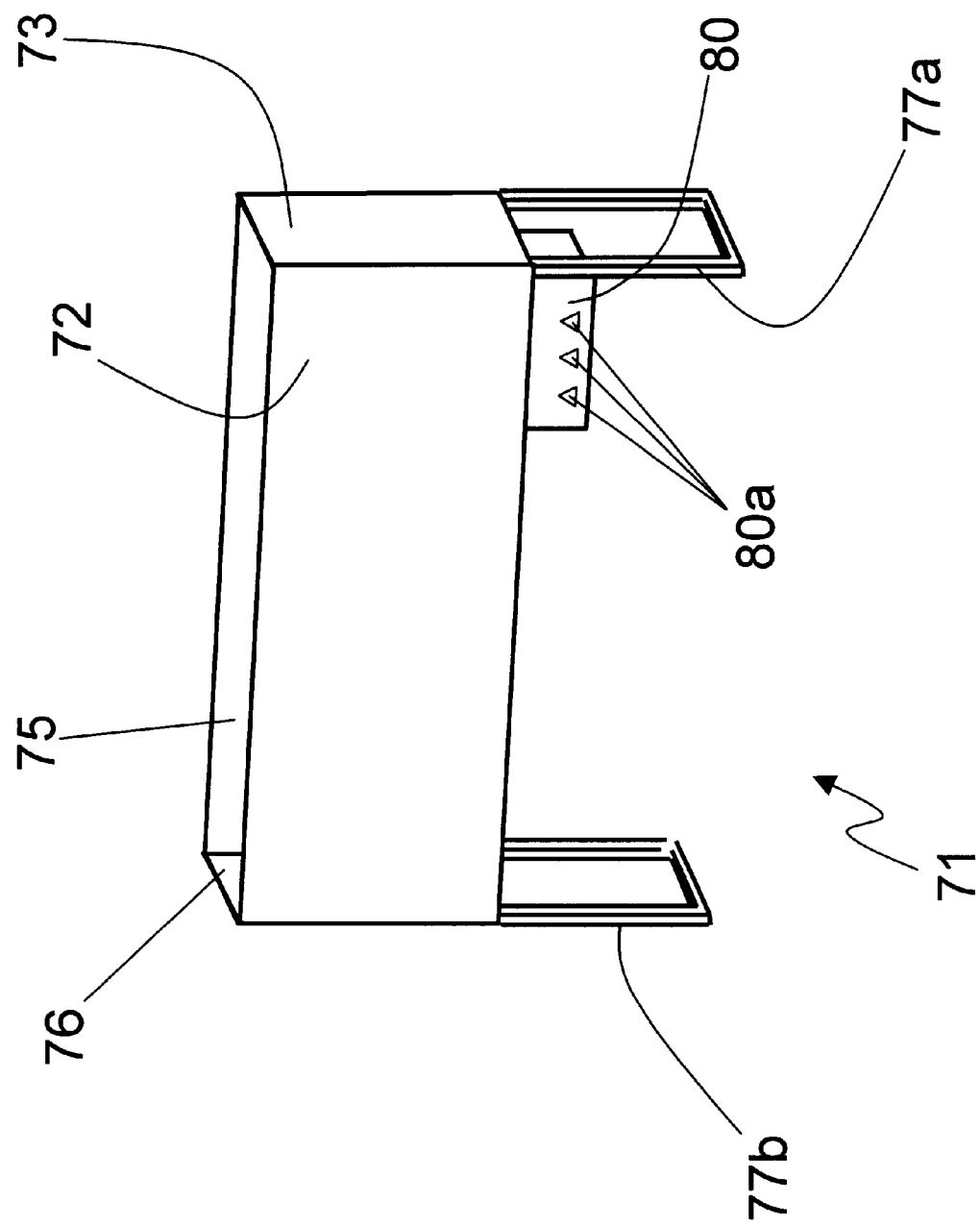
FIG. 15 presents a reconfigurable lighting device modification to an existing grill in accordance with a fourth embodiment of the present invention.

FIG. 15 presents a reconfigurable lighting device modification to an existing grill in accordance with a fourth embodiment of the present invention. The lighting device 71 shown in FIG. 15 includes an initiator holding tray portion 80 having openings 80a to facilitate lighting of and airflow to fuel initiator contained in the initiator holding tray portion 80. In one embodiment, the initiator holding tray portion is attachable and detachable to an existing grill device 71, which includes, for example, sides 72, 73, 75, 76, and legs 77a, 77b.

Figure 16:
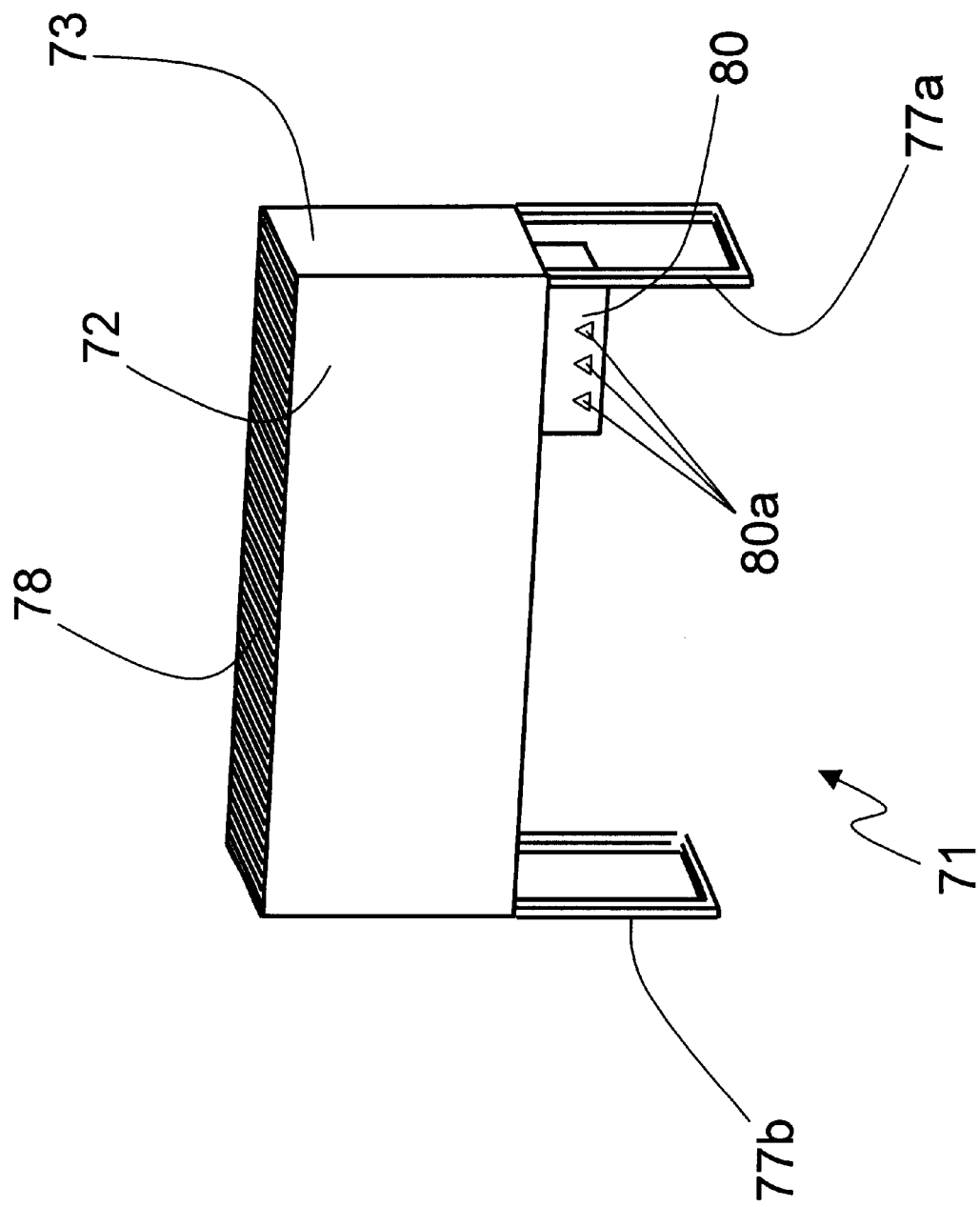
FIG. 16 shows the reconfigurable lighting device modification to an existing grill in accordance with the embodiment of FIG. 15, but with a grill surface placed atop the grill device.

FIG. 16 shows the reconfigurable lighting device modification to an existing grill in accordance with the embodiment of FIG. 15, but with a grill surface 78 placed atop the grill device 71. This arrangement is useful for cooking food, for example, following lighting of fuel within the grill device 71.

Figure 17:
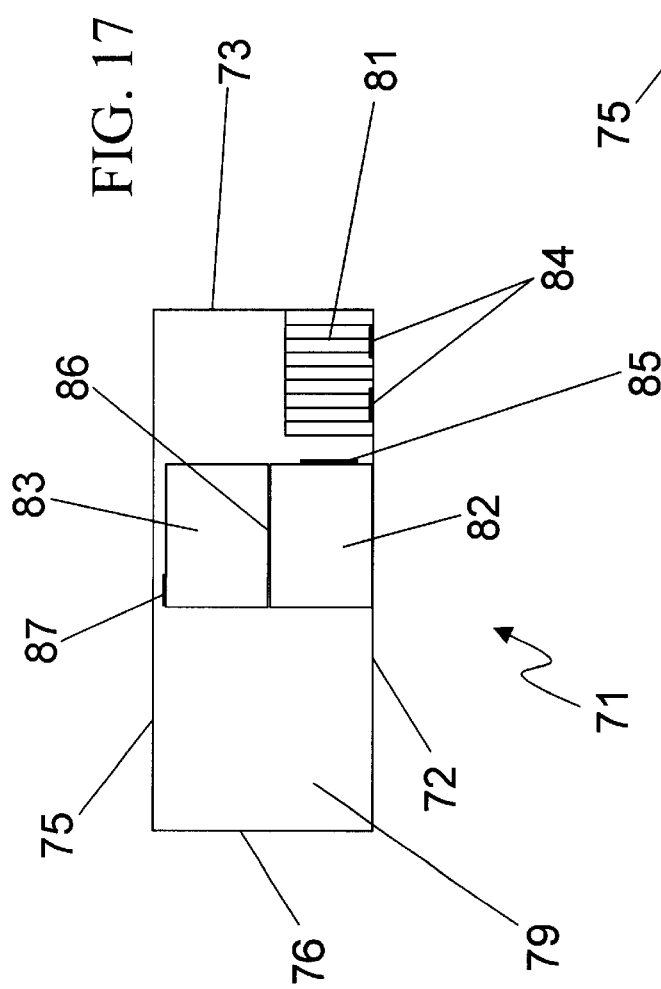
FIGS. 17 and 18 present overhead views of configurations of the fuel lighting components of the device of FIGS. 15 and 16.
Figure 18:
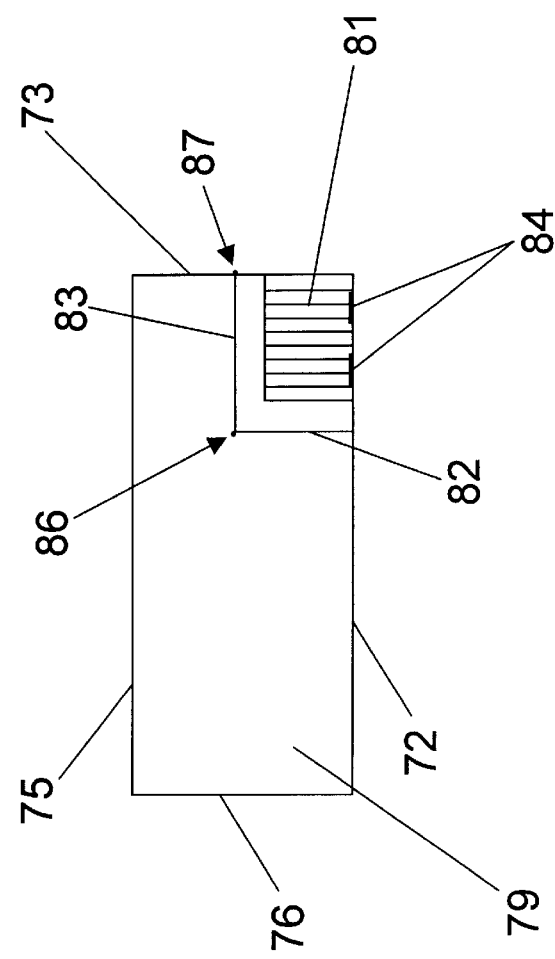

FIGS. 17 and 18 present overhead views of configurations of the fuel lighting components of the device of FIGS. 15 and 16. As shown in FIGS. 17 and 18, these lighting components further include a rack top trap door 81, and a two piece fuel containment portion 82, 83. The two piece fuel containment portion 82, 83 includes two doors 82, 83 pivotably connected by, for example, a hinge 86, that are arrangeable within the existing grill sides 72, 73 so as to form a containment area above the initiator holding tray 80, as viewed in FIG. 15. In use, fuel initiator is placed within the initiator holding tray portion 80, as shown in FIG. 15, which includes openings 80a for allowing lighting of the initiator and air flow to the initiator. The trap door rack top 81 for the initiator holding tray 80 is placed or pivotably moved via, for example, one or more hinges 84, so as to cover the initiator holding tray portion 80, and the pivotably connected doors 82, 83 are arranged and connected to at least one existing grill side 73 so as to form a fuel containment area within a corner of the existing grill 71.

Figure 19:
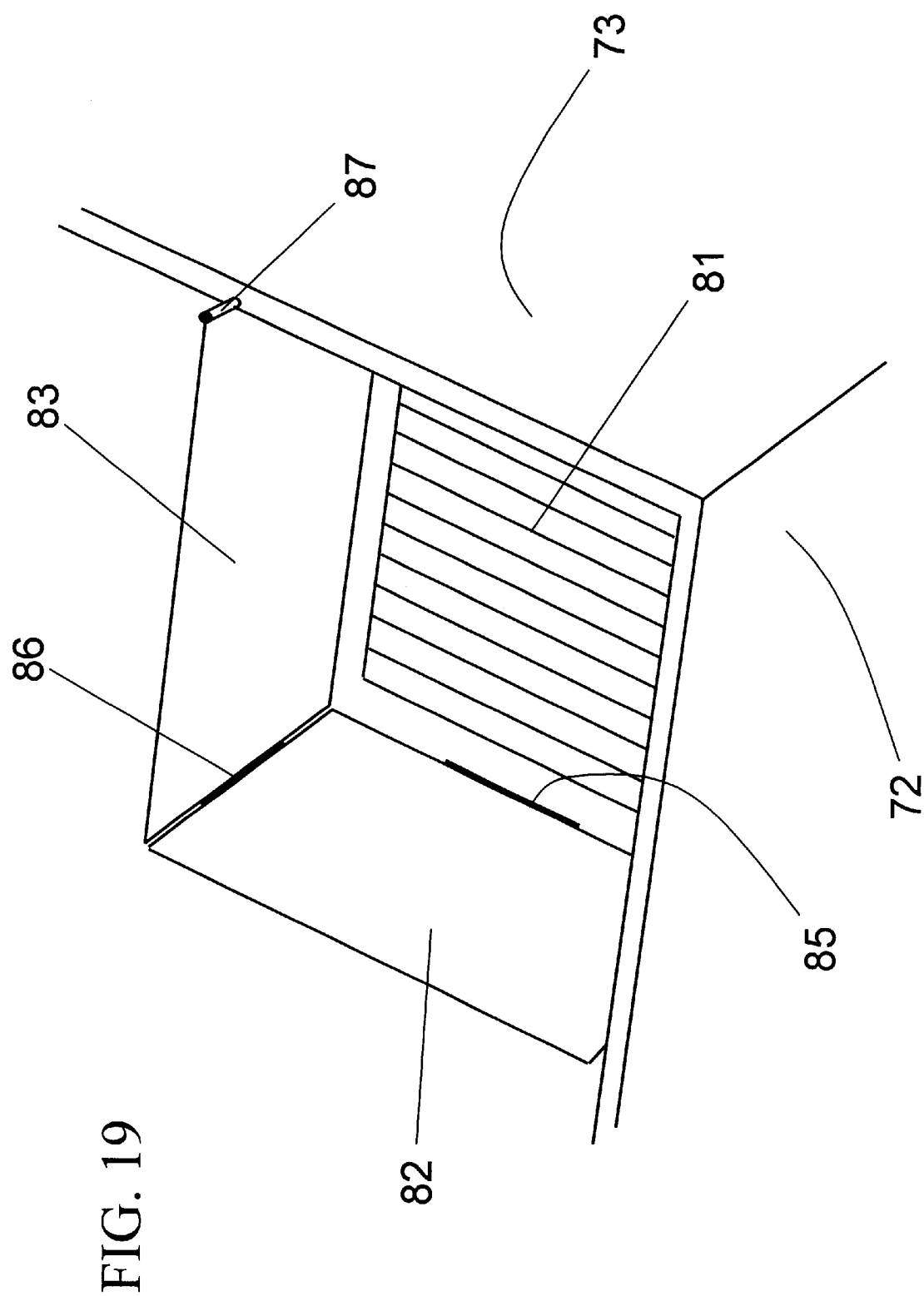
FIG. 19 presents a perspective closeup view of the arrangement of the fuel lighting device of the fourth embodiment of the present invention shown in FIG. 18.

In one embodiment, at least one pivotably connected door 83 is connected to the existing grill sides using at least one locator pin 87, as further shown in the closeup perspective view of FIG. 19. Fuel, such as charcoal, is then placed in the fuel containment area, and the initiator is ignited, such that the fuel is able to light. Upon lighting of the fuel, the pivotably connected doors are repositioned, so that the lit fuel is dispersed within the existing grill and grilling can begin.

In one embodiment, the existing grill 71 is altered for use with the second embodiment of the lighting device of the present invention. In this embodiment, an opening is made, such as by cutting, in one corner area of the bottom 79 of the existing grill 71. The initiator holding tray portion 80 is then attachably suspended from the existing grill 71, as shown in FIG. 15. In one embodiment, the initiator holding tray portion 80 is detachable, to allow, for example, more compact storage of the altered existing grill device 71.

In one embodiment, the two pivotably connected doors 82, 83 are connected to the existing grill bottom 79 by a second pivotable connection 85, such as one or more hinges, via one of the two doors 82. In this embodiment, the pivotably connected doors 82, 83 are moveable between two positions. In a first position, as shown in FIGS. 18 and 19, the two doors 82, 83 are pivoted so as to be perpendicular to the bottom 79 of the existing grill 71. A first door 82 is pivotably attached to the bottom 79, and the second door 83 is pivotably attached to the first door 82 by, for example, one or more hinges 86. The second door 83 is pivoted relative to the first door 82, so that the two doors 82, 83 are positioned at an approximately right angle to one another. The second door 83 is attached to a side 73 of the existing grill 71, and the two connected doors 82, 83 in conjunction with portions of two adjacent sides 72, 73 of the existing grill 71 form a generally square cross sectional containment subportion of the grill area in one corner of the existing grill bottom 79. In a second position, as shown in FIG. 17, the first and second doors 82, 83 are coplanar, parallel to the grill bottom 79, and adjacent the grill bottom 79; thus, the two doors 82, 83 rest on top of the grill bottom 79 and adjacent one another in this position.

Example embodiments of the present invention have now been described in accordance with the above advantages. It will be appreciated that these examples are merely illustrative of the invention. Many variations and modifications will be apparent to those skilled in the art.

What is claimed is:

1. A reconfigurable fuel lighting device, comprising:
   a housing, the housing including a first side having a first hinge coupling to a second side, the second side having a second hinge coupling to a third side, and the third side having a hinge coupling to a fourth side;
   a handle attached to the housing, the handle being moveable from at least a first position to a second position, wherein the handle includes an insulated portion; wherein in the first position, the handle is approximately coplanar with at least one of the first side, the second side, the third side, and the fourth side; and wherein in the second position, the handle extends from at least one of the first side, the second side, the third side, and the fourth side; and
   a positionable rack for holding fuel, the rack having a leg, the leg being moveable from at least a first position to a second position; wherein in the first position, the leg is approximately coplanar with the rack; and wherein in the second position, the leg is capable of supporting the rack;
   wherein the device is reconfigurable via the first hinge coupling, the second hinge coupling, and the third hinge coupling into a first configuration; wherein in the first configuration, the first side, the second side, the third side, and the fourth side of the housing form an enclosure, the enclosure enhancing ignition of the fuel; wherein the handle is placed in the second position to enable handling of the device via the insulated portion of the handle; and wherein the leg is placed in the second position to support the rack; and
   wherein the device is reconfigurable via the first hinge coupling, the second hinge coupling, and the third hinge coupling to a second configuration; wherein in the second configuration, the first side, the second side, the third side, the fourth side, the rack, the leg, and the handle are generally coplanar; the device in the second configuration having a thin profile.

2. The fuel lighting device of claim 1, wherein the rack is positionable via an attached leg.

3. The fuel lighting device of claim 2, wherein the attached leg is pivotably coupled to the rack.

4. The fuel lighting device of claim 1, further comprising at least one opening in at least one of the first side, the second side, the third side, and the fourth side, the at least one opening for facilitating lighting of the fuel placed in the housing when configured in the first position.

5. The fuel lighting device of claim 1, wherein the rack is moveable to support contained fuel within the enclosure of the first configuration.

6. The fuel lighting device of claim 5, wherein the rack is positionable via a rack hinge coupling.

7. The device of claim 1, wherein the device is capable of holding fuel within the enclosure in the second configuration.

8. The device of claim 7, wherein the fuel is supported by the rack in the second configuration.

9. The device of claim 8, wherein the fuel may be readily released from the device via elevation of the device, elevation of the device releasing the leg supporting the rack.

10. A reconfigurable fuel lighting device, comprising:
   a first housing side;
   a rack coupled to the first housing side via a first pivotable coupling, the rack having a leg, the leg being moveable from at least a first position to a second position; wherein in the first position, the leg is approximately coplanar with the rack; and wherein in the second position, the leg is capable of supporting the rack;
   a second housing side coupled to the first housing side via a second pivotable coupling;
   a third housing side coupled to the second housing side via a third pivotable coupling;
   a fourth housing side coupled to the third housing side via a third pivotable coupling; fixing device for fixably positioning the first housing side, the second housing side, the third housing side, and the fourth housing side in at least one position; and
   a handle attached to at least one of the first housing side, the second housing side, the third housing side, and the fourth housing side, the handle being moveable from at least a first position to a second position, wherein the handle includes an insulated portion; wherein in the first position, the handle is approximately coplanar with at least one of the first side, the second side, the third side, and the fourth side; and wherein in the second position, the handle extends from at least one of the first side, the second side, the third side, and the fourth side;
   wherein the device is reconfigurable via the first pivotable coupling, the second pivotable coupling, the third pivotable coupling, and the fourth pivotable coupling into a first configuration, wherein, in the first configuration, the first housing side, the second housing side, the third housing side, and the fourth housing side closeably form an enclosure, the enclosure enhancing ignition of fuel placed within the enclosure; wherein the handle is placed in the second position to enable handling of the device via the insulated portion of the handle; and wherein the leg is placed in the second position to support the rack; and
   wherein the device is reconfigurable via the first pivotable coupling, the second pivotable coupling, the third pivotable coupling, and the fourth pivotable coupling to a second configuration, wherein the first grill side, the second housing side, the third housing side, and the fourth housing side are generally parallel, such that the device has a thin profile.

11. The device of claim 1, wherein the device is capable of being carried via the handle in the second configuration.

12. A method for configuring and reconfiguring a fuel lighting device, the fuel lighting device comprising a first housing side, a second housing side coupled to the first housing side via a first pivotable coupling, a third housing side coupled to the second housing side via a second pivotable coupling, a fourth housing side coupled to the third housing side via a third pivotable coupling; a handle coupled to one side, the handle being moveable to a first position coplanar with the attached side; and a rack having a pivotable leg, the leg being moveable to a first position coplanar with the rack and to a second position so as to allow supporting of the rack, wherein the rack is coupled to at least one side via a fourth pivotable coupling, the method comprising:
   configuring the fuel lighting device in a first configuration, configuring in the first configuration including:
      moving the first side and the second side to a first configuration first and second side position via the first pivotable coupling;
      moving the third side to a first configuration third side position via the second pivotable coupling;
      moving the fourth side to a first configuration fourth side position via the third pivotable coupling;
      moving the rack to a first configuration rack position via the fourth pivotable coupling;
      moving the handle to the second position to allow handling of the device via the insulated portion; and
      arranging the rack and the pivotable leg, such that the leg supports the rack in the second position;
   wherein, in the first configuration, the first side, the second side, the third side, and the fourth side closeably form an enclosure bounding the rack, the enclosure enhancing ignition of fuel placed within the enclosure on the rack; and
   wherein the fuel lighting device is reconfigurable via the first pivotable coupling, the second pivotable coupling, the third pivotable coupling, and the fourth pivotable coupling to a second configuration, wherein the first side, the second side, the third side, the fourth side, the rack, the handle in the first position, and the leg in the first position are generally coplanar, the device thereby having a generally flat profile.

13. A fuel lighting device, comprising:
   a housing of at least three pivotably coupled sides;
   a handle having an insulated portion, the handle being pivotably coupled to one of the at least three sides, the handle being moveable to a first handle position and a second handle position; and
   a rack having a pivotable attached leg, the rack being attached to one of the at least three sides, wherein the rack and the attached leg are moveable to a first rack and leg position and a second rack and leg position;
   wherein in a first device configuration, the at least three sides are cooperatively arrangeable with the rack and the leg in the first rack and leg position, and the handle in the first handle position, the device in the first device configuration forming a partially enclosed structure for enhancing lighting of fuel placed on the rack, wherein the leg supports the rack and the fuel, and wherein the handle in the first handle position allows movement of the device in the first configuration;
   wherein the fuel placed on the rack when the device is in the first configuration is releaseable from the device upon movement of the device via the handle in the first handle position, the movement of the device releasing support of the rack by the attached leg; and
   wherein in a second device configuration, the at least three sides, the handle in the second handle position, and the rack and attached leg in the second rack and handle position are generally coplanar, the device having a generally thin profile and being carryable via the handle.

* * * * *